United States Patent
Li et al.

(10) Patent No.: US 9,213,047 B2
(45) Date of Patent: Dec. 15, 2015

(54) METHOD AND APPARATUS OF ELECTRICAL PROPERTY MEASUREMENT USING AN AFM OPERATING IN PEAK FORCE TAPPING MODE

(71) Applicant: Bruker Nano, Inc., Santa Barbara, CA (US)

(72) Inventors: Chunzeng Li, Goleta, CA (US); Yan Hu, Ventura, CA (US); Ji Ma, Thousand Oaks, CA (US); Jianli He, Goleta, CA (US); Lin Huang, Santa Barbara, CA (US); Stephen C. Minne, Santa Barbara, CA (US); Henry Mittel, San Ramon, CA (US); Weijie Wang, Thousand Oaks, CA (US); Shuiqing Hu, Santa Barbara, CA (US); Chanmin Su, Ventura, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 148 days.

(21) Appl. No.: 13/925,385

(22) Filed: Jun. 24, 2013

(65) Prior Publication Data

US 2013/0276174 A1    Oct. 17, 2013

Related U.S. Application Data

(63) Continuation-in-part of application No. 13/306,867, filed on Nov. 29, 2011, now Pat. No. 8,650,660, and a continuation-in-part of application No. 12/618,641, filed on Nov. 13, 2009, now Pat. No. 8,739,309.

(Continued)

(51) Int. Cl.
*G01Q 60/24* (2010.01)
*G01Q 20/00* (2010.01)
*B82Y 35/00* (2011.01)
*G01Q 10/06* (2010.01)

(Continued)

(52) U.S. Cl.
CPC .............. *G01Q 20/00* (2013.01); *B82Y 35/00* (2013.01); *G01Q 10/065* (2013.01); *G01Q 20/02* (2013.01); *G01Q 60/30* (2013.01); *G01Q 60/32* (2013.01); *G01Q 60/34* (2013.01)

(58) Field of Classification Search
None
See application file for complete search history.

(56) References Cited

U.S. PATENT DOCUMENTS 4,724,318 A    2/1988  Binnig
5,060,248 A *  10/1991 Dumoulin ...................... 378/53

(Continued)

FOREIGN PATENT DOCUMENTS

CN    1253291    5/2000
CN    2591559    12/2003

(Continued)

OTHER PUBLICATIONS

EPO Communication dated Jan. 12, 2015, for EP App. 11 846 886.7.

(Continued)

*Primary Examiner* — Andrew Smyth
(74) *Attorney, Agent, or Firm* — Boyle Fredrickson S.C.

(57) ABSTRACT

An apparatus and method of collecting topography, mechanical property data and electrical property data with an atomic force microscope (AFM) in either a single pass or a dual pass operation. PFT mode is preferably employed thus allowing the use of a wide range of probes, one benefit of which is to enhance the sensitivity of electrical property measurement.

17 Claims, 14 Drawing Sheets

Related U.S. Application Data

(60) Provisional application No. 61/663,528, filed on Jun. 22, 2012, provisional application No. 61/417,837, filed on Nov. 29, 2010, provisional application No. 61/114,399, filed on Nov. 13, 2008.

(51) Int. Cl.
*G01Q 60/32* (2010.01)
*G01Q 20/02* (2010.01)
*G01Q 60/30* (2010.01)
*G01Q 60/34* (2010.01)

(56) References Cited

U.S. PATENT DOCUMENTS

| | | | |
|---|---|---|---|
| 5,229,606 A | 7/1993 | Elings et al. | |
| 5,266,801 A | 11/1993 | Elings et al. | |
| RE34,489 E | 12/1993 | Hansma et al. | |
| 5,267,471 A | 12/1993 | Abraham et al. | |
| 5,412,980 A | 5/1995 | Elings et al. | |
| 5,415,027 A | 5/1995 | Elings et al. | |
| 6,005,246 A | 12/1999 | Kitamura et al. | |
| 6,008,489 A | 12/1999 | Elings et al. | |
| 6,441,371 B1 | 8/2002 | Ahn et al. | |
| 6,519,221 B1* | 2/2003 | Manalis et al. | 369/126 |
| 6,690,008 B2* | 2/2004 | Hantschel et al. | 850/40 |
| 6,880,386 B1 | 4/2005 | Krotil et al. | |
| 6,935,167 B1* | 8/2005 | Sahin et al. | 73/105 |
| 7,129,486 B2 | 10/2006 | Spizig et al. | |
| 7,249,002 B1 | 7/2007 | Ben-Dov et al. | |
| 7,395,698 B2* | 7/2008 | Degertekin | 73/105 |
| 7,441,447 B2* | 10/2008 | Degertekin et al. | 73/105 |
| 7,448,798 B1* | 11/2008 | Wang | 374/183 |
| 7,461,543 B2* | 12/2008 | Degertekin | 73/105 |
| 7,464,583 B1 | 12/2008 | Kowalewski et al. | |
| 7,478,552 B2 | 1/2009 | Gotthard et al. | |
| 7,550,963 B1* | 6/2009 | Xiang et al. | 324/754.23 |
| 7,552,625 B2* | 6/2009 | Degertekin | 73/105 |
| 7,596,989 B2 | 10/2009 | Humphris et al. | |
| 7,617,719 B2* | 11/2009 | Su et al. | 73/105 |
| 7,637,149 B2* | 12/2009 | Degertekin et al. | 73/105 |
| 7,665,350 B2 | 2/2010 | Giessibl | |
| 7,707,873 B2* | 5/2010 | Degertekin | 73/105 |
| 8,220,318 B2* | 7/2012 | Degertekin | 73/105 |
| 2002/0096642 A1 | 7/2002 | Massie | |
| 2002/0174714 A1 | 11/2002 | McWaid et al. | |
| 2004/0134264 A1 | 7/2004 | Massie | |
| 2005/0030054 A1 | 2/2005 | Chang | |
| 2005/0266586 A1* | 12/2005 | Linder et al. | 438/4 |
| 2006/0260388 A1* | 11/2006 | Su et al. | 73/105 |
| 2006/0283338 A1* | 12/2006 | Degertekin | 99/486 |
| 2007/0012094 A1* | 1/2007 | Degertekin et al. | 73/105 |
| 2007/0024295 A1 | 2/2007 | Humphris et al. | |
| 2007/0082459 A1* | 4/2007 | Faris | 438/455 |
| 2007/0084273 A1 | 4/2007 | Hare et al. | |
| 2007/0089496 A1* | 4/2007 | Degertekin | 73/104 |
| 2007/0103697 A1* | 5/2007 | Degertekin | 356/501 |
| 2007/0107502 A1* | 5/2007 | Degertekin | 73/105 |
| 2007/0220958 A1 | 9/2007 | Gotthard et al. | |
| 2007/0295064 A1* | 12/2007 | Degertekin et al. | 73/105 |
| 2008/0022759 A1 | 1/2008 | Su et al. | |
| 2008/0127722 A1* | 6/2008 | Su et al. | 73/105 |
| 2008/0295583 A1 | 12/2008 | Giessibl | |
| 2008/0295584 A1* | 12/2008 | Cantrell et al. | 73/105 |
| 2008/0307865 A1* | 12/2008 | Degertekin | 73/105 |
| 2009/0064772 A1* | 3/2009 | Wang | 73/105 |
| 2010/0039919 A1* | 2/2010 | Chou et al. | 369/126 |
| 2010/0045970 A1* | 2/2010 | Raschke | 356/51 |
| 2011/0167524 A1* | 7/2011 | Hu et al. | 850/1 |
| 2011/0170108 A1* | 7/2011 | Degertekin | 356/454 |

FOREIGN PATENT DOCUMENTS

| | | |
|---|---|---|
| JP | H11-133038 | 5/1999 |
| JP | H11-352135 | 12/1999 |
| JP | 2001 108601 | 4/2001 |
| JP | 2001108601 | 4/2001 |
| JP | 3229329 | 11/2001 |
| JP | 3536973 | 6/2004 |
| JP | 2004170281 | 6/2004 |
| JP | 2005-512100 | 4/2005 |
| JP | 4452278 | 4/2010 |
| WO | 0248644 | 6/2002 |
| WO | 2010032429 | 3/2010 |
| WO | 2010/065131 | 6/2010 |

OTHER PUBLICATIONS

Kwak et al, "Imaging stretched single DNA molecules by pulsed-force-mode atomic force microscopy", Scient Direct (www.sciencedirect.com), DOI: 10.1016/S0304-3991(03)00049-4, (2003), pp. 249-255.

Kruger et al, "Scanning Force Microscopy Based Rapid Force Curve Acquisition on Supported Lipid Bilayers: Experiments and Simulations Using Pulsed Force Mode", ChemPhysChem (www.chemphyschem.org), DOI: 10.1002/cphc.200301059, (2004), pp. 989-997.

Kresz et al, "Investigation of pulsed laser deposited crystalline PTFE thin layer with pulsed force mode AFM", Science Direct (www.sciencedirect.com), DOI: 10.1016/j.tsf.2003.11.254, (2003), pp. 239-244.

Shanmugham et al, "Polymer Nanowire Elastic Moduli Measured with Digital Pulsed Force Mode AFM", American Chemical Society, DOI: 10.1021/la0505380, Jun. 11, 2005, pp. 10214-10218.

Zhang et al, "Pulsed-Force-Mode AFM Studies of Polyphenylene Dendrimers on Self Assembled Monolayers", The Journal of Physical Chemistry, DOI: 10.1021/jp073388u, May 23, 2007, pp. 8142-8144.

Jradi et al, "Analysis of photopolymerized acrylic films by AFM in pulsed force mode", Journal of Microscopy, vol. 229, Pt 1 2008, pp. 151-161.

Miyatani et al, "Mapping of electrical double-layer force between tip and sample surfaces in water with pulsed-force-mode atomic force microscopy", American Institute of Physics (http://apl.aip.org/apl/copyright.jsp), vol. 71, No. 18, Nov. 3, 1997, pp. 2632-2634.

Moreno-Herrero et al, "Characterization by Atomic Force Microscopy of Alzheimer Paired Helical Filaments under Physiological Conditions", Biophysical Journal, vol. 86, Jan. 2004, pp. 517-525.

Sotres et al, "Jumping mode AFM Imaging of biomolecules in the repulsive electrical double layer", Science Direct (www.sciencedirect.com). DOI: 10.1016/j.ultramic.2001.01.020, Jan. 31, 2007, pp. 1207-1212.

Kwak et al, "Topographic effects on adhesive force mapping of stretched DNA molecules by pulsed-force-mode atomic force microscopy", Science Direct (www.sciencedirect.com), DOI: 10.1016/j.ultramic.2003.11.005, Nov. 24, 2003, pp. 179-186.

Moreno-Herrero et al, "DNA height in scanning force microscopy", Science Direct (www.sciencedirect.com), DOI: 10.1016/S0304-3991(03)00004-4, Nov. 22, 2002, pp. 167-174.

Moreno-Herrero et al, "Jumping mode atomic force microscopy obtains reproducible images of Alzheimer paired helical filaments in liquids", Science Direct (www.sciencedirect.com), DOI: 10.1016/j.eurpolymi.2004.01.018, Jan. 20, 2004, pp. 927-932.

Moreno-Herrero et al, "Atomic force microscopy contact, tapping, and jumping modes for imaging biological samples in liquids", The American Physical Society, Physical Review E 69, 031915, 2004, pp. 031915-1-031915-9.

Jiao et al, "Accurate Height and Volume Measurements on Soft Samples with the Atomic Force Microscope", American Chemical Society, DOI: 10.1021/la048650u, Oct. 8, 2004, pp. 10038-10045.

Weaver et al, "High resolution atomic force microscopy potentiometry", J. Vac. Sci. Technol. B 9 (3), May/Jun. 1991, pp. 1559-1561.

Krotil et al, "Pulsed Force Mode: a New Method for the Investigation of Surface Properties", Surface and Interface Analysis, vol. 27, 1999, pp. 336-340.

(56) References Cited

OTHER PUBLICATIONS

Miyatani et al, "Surface charge mapping of solid surfaces in water by pulsed-force-mode atomic force microscopy", Applied Physics A Materials Science & Processing, vol. A 66, 1998, pp. S349-S352.

Maivaldt et al, "Using force modulation to image surface elasticities with the atomic force microscope", Nanotechnology 2, Feb. 20, 1991, pp. 103-106.

Martl et al, "Control electronics for atomic force microscopy". American Institute of Physics, v. Bal Instrum 69 (8), Jun. 1988, No. 6, pp. 836-839.

Sarid et al, "Driven nonlinear atomic force microscopy cantilevers: From noncontact to tapping modes of operation", American Vacuum Society, J. Vac Sci. Technol. B 14(2), Mar./Apr. 1996, pp. 864-867.

Dr. Profos et al, "Handbuch der industriellen Messtechnik", R. Oldenbourg Verlag Munchen Wien, Feb. 11, 1992, pp. 203-206.

Marti et al, "Reibungsmikroskopie", Aus der Wissenshaft, Phys. B1. 48 Nr. 12, 1992, pp. 1007-1009.

Rosa et al, "The simultaneous measurement of elastic, electrostatic and adhesive properties by scanning force microscopy: pulsed-force mode operation", Department of Experimental Physics, University of Ulm, Jul. 29, 1997, pp. 1-6.

Radmacher et al, "Imaging Adhesion Forces and Elasticity of Lysozyme Adsorbed on Mica with the Atomic Force Microscope", American Chemical Society, Jul. 11, 1994, pp. 3809-3814.

Spatz et al, "Forces affecting the substrate in resonant tapping force microscopy", University of Ulm, May 23, 1995, pp. 40-44.

Radmacher et al, "Mapping Interaction Forces with the Atomic Force Microscope", Department of Physics, University of California, Mar. 7, 1994, pp. 2159-2165.

Martin et al, "Atomic force microscope-force mapping and profiling on a sub 100-A scale", American Institute of Physics, J. Appl. Phys. 61 (10), May 15, 1987, pp. 4723-4729.

Mizes et al, "Submicron probe of polymer adhesion with atomic force microscopy: Dependence on topography and material inhomogeneities", American Institute of Physics, Appl. Phys. Lett. 59 (22), Nov. 25, 1991, pp. 2901-2903.

Ven Der Werf et al, "Adhesion force imaging in air and liquid by adhesion mode atomic force microscopy", American Institute of Physics, Appl. Phys. Lett. 65 (9), Aug. 29, 1994, pp. 1195-1197.

Nonnenmacher et al, "Kelvin probe force microscopy", Appl. Phys. Lett. 58 (25), Jun. 24, 1991, pp. 2921-2923.

Kitamura et al, "High-resolution imaging of contact potential difference with ultrahigh vacuum noncontact atomic force microscope", Appl. Phys. Lett. 72 (24), Jun. 15, 1998, pp. 3154-3156.

Mohn et al, "Imaging the charge distribution within a single molecule", Nature Nanotechnology 7, 227-231 (2012).

Zerweck et al, "Accuracy and resolution limits of Kelvin probe force microscopy", Phys. Rev. B 71, 125424 (2005).

\* cited by examiner

METHOD AND APPARATUS OF ELECTRICAL PROPERTY MEASUREMENT USING AN AFM OPERATING IN PEAK FORCE TAPPING MODE

CROSS-REFERENCE TO RELATED APPLICATIONS

This application is a non-provisional application claiming priority to Provisional Patent Application Ser. No. 61/663,528, filed on Jun. 22, 2012, entitled Method and Apparatus of Electrical Property Measurement Using an AFM Operating in Peak Force Tapping Mode. It is also a continuation-in-part of and claims priority to U.S. Non-Provisional patent application Ser. No. 13/306,867, tiled on Nov. 29, 2011, which claims priority to Provisional Patent Application Ser. No. 61/417,837, filed on Nov. 29, 2010, both entitled Method and Apparatus of Using Peak Force Tapping Mode to Measure Physical Properties of a Sample, and is also a continuation-in-part of U.S. patent application Ser. No. 12/618,641, filed on Nov. 13, 2009, entitled Method and Apparatus of Operating a Scanning Probe Microscope, which in turn, claims priority under 35 USC §1.119(e) to U.S. Provisional Patent Application Ser. No. 61/114,399, filed Nov. 13, 2008. The subject matter of these applications is hereby incorporated by reference in their entirety.

BACKGROUND OF THE INVENTION

1. Field of the Invention

The preferred embodiments are directed to scanning probe microscopy methods and apparatus, and more particularly, using an atomic force microscope (AFM) to collect topography, mechanical and electrical sample property data, preferably using peak force tapping mode (PFT mode) AFM and Kelvin Probe Force Microscopy (KPFM), respectively.

2. Description of Related Art

Scanning probe microscopes (SPMs), such as the atomic force microscope (AFM), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding map of the sample can be generated.

A typical AFM system is shown schematically in FIG. 11. An AFM 10 employs a probe device 12 including a probe 17 having a cantilever 15. A scanner 24 generates relative motion between the probe 17 and a sample 22 while the probe-sample interaction is measured. In this way, images or other measurements of the sample can be obtained. Scanner 24 is typically comprised of one or more actuators that usually generate motion in three mutually orthogonal directions (XYZ). Often, scanner 24 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et alt U.S. Pat. No. 5,266,801; and Elings et al. U.S. Pat. No. 5,412,980.

In a common configuration, probe 17 is often coupled to an oscillating actuator or drive 16 that is used to drive probe 17 to oscillate at or near a resonant frequency of cantilever 15. Alternative arrangements measure the deflection, torsion, or other characteristic of cantilever 15. Probe 17 is often a microfabricated cantilever with an integrated tip 17.

Commonly, an electronic signal is applied from an AC signal source 18 under control of an SPM controller 20 to cause actuator 16 (or alternatively scanner 24) to drive the probe 17 to oscillate. The probe-sample interaction is typically controlled via feedback by controller 20. Notably, the actuator 16 may be coupled to the scanner 24 and probe 17 but may be formed integrally with the cantilever 15 of probe 17 as part of a self-actuated cantilever/probe.

As a selected probe 17 is oscillated, it is brought into contact with sample 22 as sample characteristics are monitored by detecting changes in one or more characteristics of the oscillation of probe 17, as described above. In this regard, a deflection detection apparatus 25 is typically employed to direct a beam towards the backside of probe 17, the beam then being reflected towards a detector 26, such as a four quadrant photodetector. The deflection detector is often an optical lever system such as described in Hansma et at U.S. Pat. No. RE 34,489, but may be some other deflection detector such as strain gauges, capacitance sensors, etc. The sensing light source of apparatus 25 is typically a laser, often a visible or infrared laser diode. As the beam translates across detector 26, appropriate signals are processed by a signal processing block 28 (e.g., to determine the RMS deflection of probe 17). The interaction signal (e.g., deflection) is then transmitted to controller 20, which processes the signals to determine changes in the oscillation of probe 17. In general, controller 20 determines an error at Block 30, then generates control signals (e.g., using a PI gain control Block 32) to maintain a relatively constant interaction between the tip and sample (or deflection of the lever 15), typically to maintain a setpoint characteristic of the oscillation of probe 17. The control signals are typically amplified by a high voltage amplifier 34 prior to, for example, driving scanner 24. For example, controller 20 is often used to maintain the oscillation amplitude at a setpoint value, $A_S$, to insure a generally constant force between the tip and sample. Alternatively, a setpoint phase or frequency may be used. Controller 20 is also referred to generally as feedback where the control effort is to maintain a constant target value defined by the setpoint.

A workstation 40 is also provided, in the controller 20 and/or in a separate controller or system of connected or stand-alone controllers, that receives the collected data from the controller 20 and manipulates the data obtained during scanning to perform data manipulation operating such as point selection, curve fitting, and distance determining operations. The workstation can store the resulting information in memory, use it for additional calculations, and/or display it on a suitable monitor.

AFMs may be designed to operate in a variety of modes, including contact mode and oscillating mode. Operation is accomplished by moving the sample and/or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one practical mode of AFM operation, known as Tapping-Mode™ AFM (TappingMode™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation. Alternative feedback arrangements keep the phase or oscillation frequency constant. As in contact mode, these feedback signals are then collected, stored and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research. Note that "SPM" and the acronyms for the specific types of SPMs, may be used herein to refer to either the microscope apparatus or the associated technique, e.g., "atomic force microscopy."

Kelvin-Probe Force Microscopy (KPFM), also known as Surface Potential Microscopy (SPoM), Surface Electric Potential Microscopy (SEPM), has been an important tool for electrical measurements using scanning probe microscopes (SPMs), such as AFMs, for many years.

Fundamentally, KPFM is a combination of atomic force microscopy (AFM) and Kelvin probe technique. Kelvin probe technique was designed to measure the contact potential difference (CPD) between an AFM probe and a sample surface when the two are brought close to one another. The CPD depends largely on the work function difference between the two materials. In this regard, the work function of a sample under test can be deduced if the work function of the probe is calibrated against a sample having a well-defined work function. Traditional Kelvin probe technique has a high sensitivity for potential measurements but offers poor spatial resolution. The invention of atomic force microscope (AFM) by Binnig et al. in 1986 (U.S. Pat. No. 4,724,318) opened the door to imaging solid sample surfaces of all kinds with nanometer to atomic resolution. Weaver et al. adapted Kelvin probe technique and combined it with AFM in 1991 ("*High Resolution Atomic Force Microscopy Potentiometry*", Weaver et al., *J. Vac. Sci. Technol. B Vol. 9, No. 3, May/June* 1991, pp. 1559-1561); Normenmacher et al. coined the term Kelvin probe force microscopy shortly after ("*Kelvin Probe Force Microscopy*", Normenmacher et al., *Appl. Phys. Lett. Vol. 58. No. 25, June* 1991, *pp.* 2921-2923). Thereafter, different AFM modes and KPFM detection schemes have appeared, and the various combinations of them have flourished the art.

Instead of measuring current as in Kelvin probe technique, KPFM is based on force measurement, employing the sensitive force detection capability in an AFM. The AFM probe and sample together is modeled as a parallel plate capacitor, the force between is thus:

$$F_{el} = -\frac{1}{2}\frac{\partial C}{\partial z}(\Delta V)^2$$

where $F_{el}$ is the electric force, C the capacitance, and $\Delta V$ the voltage difference. $\Delta V$ can be the sum of CPD $$\left(\frac{\Delta\phi}{e}\right),$$

and the externally applied DC $V_{DC}$ and AC voltage $V_{AC}$ with frequency f:

$$\Delta V = V_{DC} - \frac{\Delta\phi}{e} + V_{AC}\sin(2\pi ft)$$

Various methods for implementing KPFM have been proposed, a discussion of some of which follows.

(i) The so-called amplitude-modulation method (AM-KPFM), in which an AC voltage between the probe and the sample excites a mechanical oscillation of the cantilever. AM-KPFM has been implemented in different variants, but common to all of them is that they minimize the electrostatic force by nullifying this electric force induced mechanical oscillation amplitude.

Pioneered by Weaver et al. in 1991, AM-KPFM includes applying an AC bias between the AFM probe and the sample, usually albeit not necessarily, at or near the mechanical resonance frequency f of the AFM cantilever to cause it to oscillate under the AC electric force there between. A DC bias voltage, also applied between the probe and the sample, is regulated by a KPFM feedback algorithm so that the oscillation at f stops. At this point, the AC electric force at frequency f is nullified, and the DC voltage applied equals exactly the CPD. As revealed by the following equation below, $$V_{DC} = \frac{\Delta\phi}{e}$$

when amplitude of the f term drops to 0. AM-KPFM is therefore a null-force technique.

$$F_{ei} = \frac{\partial C}{\partial z}\left(\left(V_{DC} - \frac{\Delta\phi}{e}\right)^2 + \frac{1}{2}V_{AC}^2\right)DC \text{ Term} +$$

$$\frac{\partial C}{\partial z}\left(V_{DC} - \frac{\Delta\phi}{e}\right)V_{AC}\sin(2\pi ft)f \text{ Term} + \frac{1}{4}\frac{\partial C}{\partial z}V_{AC}^2\cos(4\pi ft)2f \text{ Term}$$

As shown in FIG. 12, an AM-KPFM 50 includes a) an AFM control block 52 configured to operate the AFM in either intermittent contact mode (AM-AFM) or non-contact mode (FM-AFM), and b) a KPFM control block 54. AM-KPFM 50 includes a probe 56 having a lever 58 supporting a tip 60 that is caused to interact with a sample 62 (note the charge distribution shown on the sample indicating electrical properties to be measured). In either AM-AFM mode or FM-AFM mode, an AC voltage is applied to, for example, the tapping piezo 64 by source 63 to cause the AFM probe 56 to oscillate at or near its resonance frequency $f_1$. Deflection of probe 106 during operation is measured by directing a laser beam from source 68 toward the backside of lever 58 and toward detector 70. The deflection signal from detector 70 is transmitted to signal processing block 72 of AFM control block 52 to determine an appropriate control signal to maintain probe-sample interaction at a setpoint. This feedback control signal (together with a scanning control signal provided in block 74) is transmitted to an actuator 66 (e.g., an X-Y-Z piezoelectric tube) to appropriately position the probe 56 supported thereby.

AM-KPFM control block 54 includes a source 78 which delivers an AC bias at a second frequency $f_2$, is applied between the probe and the sample, giving rise to an alternating electric force between probe 56 and sample 62, causing the probe to oscillate at this frequency as well. In operation, the detected oscillation signal from detector 70 is transmitted to a lock-in amplifier 76 of control block 54 for comparison to the AC bias output by source 78. An AM-KPFM feedback block 80 generates an appropriate control voltage signal which is added to the AC bias at block 82. Control block 54 continues to adjust the DC bias so that probe oscillation at $f_2$ drops to 0. At this point $V_{dc}$ equals the contact potential difference (CPD) between sample 62 and probe 56.

(ii) The so-called frequency-modulation method (EM-KPFM) detects the resonance frequency shift $\Delta f$ induced by the bias voltage applied between tip and sample. FM-KPFM is sensitive to the electric force gradient, which is much more confined to the tip front end than electric force. Hence, for the FM method higher lateral resolution than for the force-sensitive AM method is expected.

Frequency-modulation KPFM (FM-KPFM) was introduced in 1991 by Normenmacher et al, and was perfected under ultrahigh vacuum in 1998 by Kitamura et al. ("*High-resolution Imaging of Contact Potential Difference with Ultrahigh Vacuum Noncontact Atomic Force Microscope*", Kitamura et al., *Appl. Phys. Lett.* Vol. 72, No. 24, June 1998, pp. 3154-3156; and U.S. Pat. No. 6,073,485). Typically, the cantilever is mechanically driven by a tapping piezo at or near the resonance frequency of the cantilever f, and an AC bias is applied between the probe and the sample with a frequency $f_m$ usually much lower than the fundamental probe resonant frequency. The AC bias modulates the electric force gradient between the probe and the sample, thus periodically changing the effective spring constant of the cantilever; this causes the resonance frequency to shift periodically, that is, to modulate, at $f_m$ and $2f_m$. A DC voltage is adjusted by the KPFM feedback algorithm so that the frequency modulation at $f_m$ stops. At this point, the electric force gradient is nullified, and the DC voltage applied measures the CPD, $$Vdc = \frac{\Delta\phi}{e}$$

as expressed in the following equation.

$$\frac{\partial F_{el}}{\partial z} = \frac{1}{2}\frac{\partial^2 C}{\partial z^2}\left(\left(V_{DC} - \frac{\Delta\phi}{e}\right)^2 + \frac{1}{2}V_{AC}^2\right) DC \text{ Term} +$$

$$\frac{\partial^2 C}{\partial z^2}\left(V_{DC} - \frac{\Delta\phi}{e}\right)V_{AC}\sin(2f_m t) f_m \text{ Term} +$$

$$\frac{1}{4}\frac{\partial^2 C}{\partial z^2}V_{AC}^2\cos(4\pi f_m t) 2f_m \text{ Term}$$

FM-KPFM is a null-force-gradient technique. As shown in FIG. 13, an FM-KPFM 100 includes a) an AFM control block 102 configured to operate the AFM in either intermittent contact mode (AM-AFM) or non-contact mode (FM-AFM), and b) a KPFM control block 104. AFM 102 includes a probe 106 having a lever 108 supporting a tip 110 that is caused to interact with a sample 112 (note the charge distribution shown on the sample indicating electrical properties to be measured). In either AM-AFM mode or FM-AFM mode, an AC voltage is applied to the tapping piezo 114 by source 113 to cause the AFM cantilever to oscillate at or near its resonance frequency $f_1$. Deflection of probe 106 during operation is measured by directing a laser beam from source 115 toward the backside of lever 108 and toward detector 117. The deflection signal from detector 117 is transmitted to signal processing block 118 of AFM control block 102 to determine an appropriate control signal to maintain probe-sample interaction at a setpoint. This feedback control signal (together with a scanning control signal provided in block 120) is transmitted to an actuator 116 (e.g., an X-Y-Z piezoelectric tube) to appropriately position the probe supported thereby.

FM-KPFM control block 104 includes a source 128 that provides an AC bias at frequency $f_2$, usually a few kHz, applied between the probe and the sample, giving rise to an alternating electric force gradient between probe 106 and sample 112. This force gradient will cause the probe resonant frequency to modulate, manifested as sidebands at $f_1 \pm nf_2$ which are used for KPFM feedback. The sideband frequencies are known (Block 124) and input to lock-in amplifier 122 for comparison to the output signal of detector 117. Preferably, a KPFM feedback block 126 operates to continuously adjust the DC bias (which is added to the AC bias at block 130) so that the probe response at the side bands ($f_1 \pm f_2$) drops to 0. When doing so, the $V_{dc}$ equals the contact potential difference (CPD) between sample 112 and probe 106 providing one of the electrical properties of the sample at that location.

One of the challenges with KPFM, FM-KPFM mode in particular, is that a low spring constant and high cantilever Q is desirable for making sensitive high resolution measurements. However, though one of the major advantages of SPM over other high-resolution microscopes (such as SEM) is operation in air, SPM limits possible Q values. Therefore, to achieve sensitive KPFM measurement capability, it is known that using a probe with the lowest possible spring constant can offset limited Q values of the SPM (theoretical explanation is detailed in the probe design section of this invention). However, for practical reasons (e.g., to help prevent the probe tip from sticking to the sample as it makes intermittent contact therewith), TappingMode requires use of probes having relatively high spring constants for reliable operation; and not too high a Q value to attain a bandwidth that allows a reasonably fast scan rate. KPFM sensitivity is thereby necessarily limited. Contact mode permits the use of levers having lower spring constants but is generally known to be one of the most destructive SPM techniques and is therefore limited with respect to which the types of samples with which it can be used.

KPFM accuracy and resolution can also be limited by any one or more of the following: tip wear, tip contamination (need stable tip work function), metal degradation particularly over the apex, parasitic capacitance (compromise lateral resolution), parasitic electrochemistry, unintentional charge dissipation from the sample, etc. Applicants realized a probe design that overcomes these drawbacks would be beneficial.

In the end, notwithstanding the broad application and capabilities of AFM and KPFM, limitations with each have remained. Sensitivity is the primary limitation of KPFM. Nanometer scale sample features have many interesting material properties and AFM has been one of the major tools to characterize them. However, while AFM is reliable in providing multidimensional information with very high resolution and has gained broad acceptance as the tool of choice for many applications in imaging (e.g., topography), AFM has not been as successful with respect to quantitative mechanical property characterization.

Another fundamental limitation of current KPFM is that it is integrated with Tapping Mode (or intermittent contact mode or AC mode). Stability of the tapping mode critically depends on the spring constant of the cantilever probe k, where the common value of k is about 40 N/m and can be reduced to 5 N/m with marginal performance. The sensitivity factor of the KPFM detection is defined by Q/k, where Q is the mechanical quality factor of the cantilever. Given a typical "Q" of 200 on surface, normal KPFM usually have a sensitivity factor from 5-40. Using probes having a much lower spring constant is therefore desirable; however, low spring constant probes are incompatible with the requirements of Tapping Mode feedback stability.

More particularly, conventional AFM has been known for its inability to simultaneously acquire both high-resolution images and quantitative mechanical property information (e.g., elasticity, plasticity, and adhesion). Measuring mechanical properties with an AFM experimental setup is possible, but most known methods and systems rely on collecting force curves corresponding to the local tip-sample interaction, an extremely slow process.

Additionally, current KPFM measurement systems are subject to large variations in the surface potential value, due primarily to changes at the probe apex during imaging. For example, the surface potential of gold (Au) is around 800 mV. A first concern is drift during measurement. Drift can be substantial, often exceeding hundreds of mV, thereby making accurate measurements using AFM impractical. In addition, the measured surface potential varies when a probe is replaced or used for an extended period of time, and can also vary from system to system. These changes are typically caused by uncertainty and variation of the conductive coating on the AFM probe; in particular, the crystal structure of the apex of the tip is poorly defined and changes from probe to probe.

Generally, as shown in FIG. 14, an AFM probe 600 consists of two parts, a cantilever 602 which is sensitive to the forces between the tip and the sample, and a tip 604. The tip 604 includes a body 606 having a base 608 that connects to or is otherwise support by cantilever 602 and an apex 610 having a radius in nanometer range. Apex 610 is the part of the probe that interacts with the sample, with the resolution of the AFM substantially defined by the radii of the apex. Most KPFM measurement apparatus and methods utilize either i) a coated probe (conducting), where the conducting material at apex 610 is poorly defined due primarily to inherent imperfections in the coating process, or ii) an etched metal wire, the mechanical properties of which are poorly controlled during fabrication, as understood in the art. In either case, the KPFM measurement is compromised.

In sum, the microscopy field has been left wanting a more comprehensive instrument capable of fast, high sensitivity electrical, topography, and mechanical sample property measurement. Ideally, the tool would be capable of associating the measured electrical properties with the corresponding mechanical properties of the sample at each data acquisition location.

SUMMARY OF THE INVENTION

The preferred embodiments are directed to high performance KPFM. More particularly, the invention is directed to an AFM that combines mechanical property measurement of a sample, e.g., on the nanoscale, with the capability to characterize electrical properties using a Kelvin probe configuration. The preferred embodiments make it possible to measure mechanical properties and electrical properties of a sample at the same time, with improved accuracy/resolution, at the nanometer scale, and associate that electrical property data with more credible topography and mechanical property information concerning the sample.

By employing an innovative mode of AFM operation, peak force tapping mode (PFT mode), the exemplary embodiments are able to achieve higher sensitivity factor as well as accuracy/repeatability improvements over known systems, primarily due to PFT mode's ability to support probes having higher sensitivity factor. Moreover, the exemplary embodiments combine the mechanical and electrical capabilities of AFM to substantially fully characterize samples on, e.g., the nanometer scale. While PFT methods and apparatus operate to gather data concerning mechanical properties of a sample and KPFM methods and apparatus operate to gather data concerning electrical properties of a sample, the preferred embodiments make AFM more powerful by integrating the two together. Not only does the result improve user efficiency, but also allows in situ correlation of mechanical properties and electrical properties for very small features (i.e., high resolution), thus providing new information regarding a material's characteristics and performance.

Preferably, the probe of the exemplary embodiments has a tip including a body made of a homogeneous material (conducting) from its base to its apex. Homogeneous material means the same chemical composition, physical properties (including conductivity), crystalline orientation and surface potential. In one embodiment, the tip is made of a homogeneous conducting material, with an insulating layer between the cantilever and tip base. The insulating layer can be optional but the homogeneous material of the tip (base to apex) must always be present. In an alternative embodiment, the tip and the cantilever are made of one homogeneous material that is conducting. Using either of these embodiments of the probe, the accuracy of the present KPFM measurement is substantially improved.

In one aspect preferred embodiments, a method for measuring multiple properties of a sample includes providing an atomic force microscope (AFM) including a probe having a cantilever and a tip. The method also includes operating the AFM to cause the probe to interact with the sample in a two pass procedure. During a first pass of the two pass procedure, a surface of the sample is detected by operating the AFM in PFT Mode. Then, during a second pass of the two pass procedure, electrical property data corresponding to the sample is collected.

In accordance with another aspect of the preferred embodiments, the method includes acquiring at least one of topography and mechanical property data during the detecting step. The acquiring step may include collecting mechanical property data and the mechanical property data includes at least one of elasticity, stiffness, plasticity, viscoelasticity and hardness.

In another aspect of the preferred embodiments, the probe has a sensitivity factor (Q/k) greater than 40.

According to another aspect of the preferred embodiments, the second pass of the collecting step includes using at least one of FM-KPFM and AM-KPFM. Notably, a DC bias employed in the second pass is set to zero in the first pass, and an AC bias is preferably set to equal half the fundamental cantilever resonant frequency in the second pass.

In another aspect of the preferred embodiments, the probe includes a cantilever and a tip, and the tip includes a body having a base and an apex, and wherein the body of the tip is made of a homogeneous material.

According to another aspect of this preferred embodiment, an insulating layer may be disposed between the cantilever and the tip. Alternatively, a combination of the cantilever and the tip may be made of a single homogeneous material, with no insulating layer.

A SPM configured in accordance with another preferred embodiment includes providing an atomic force microscope (AFM) having a probe defining a tip. The material of the entire tip is homogeneous. The method also includes providing relative scanning motion between the probe and a sample causing the probe to interact with the sample. The AFM is operated to collect topography data, mechanical property data and electrical property data with the probe in one of a group including a single pass procedure and a two pass procedure.

In another aspect of the preferred embodiments, the operating step includes using PFT mode to collect the topography data and the mechanical property data. More specifically, the operating step may be performed as a two pass procedure using LiftMode™, and the topography data collected in a first pass of the two pass procedure is used in the second pass.

According to another aspect of the preferred embodiments the second pass includes using FM-KPFM and wherein the FM modulation step includes providing first and second lock-in amplifiers in a cascade configuration.

In another aspect of the preferred embodiments, the probe has a spring constant less than 1 N/m.

According to a further aspect of the preferred embodiments, a method of operating a SPM includes a second pass of a two pass procedure using a high voltage detection circuit to measure a surface potential of the sample greater than ±12 volts.

According to a still further aspect of the preferred embodiments, the second pass includes applying an AC bias voltage between the probe and the sample. In this case, the AC bias voltage has a frequency lower than one-half the resonant frequency of the probe.

In a further aspect of the preferred embodiments, the method includes performing a thermal tuning step to determine the fundamental resonant frequency of the probe.

In another embodiment, a method for measuring multiple properties of a sample includes providing an atomic force microscope (AFM) including a probe having a tip, and operating the AFM to cause the probe to interact with the sample in a one pass procedure. The method also includes collecting topographic and mechanical property data corresponding to the sample using PFT mode, and collecting electrical property data corresponding to the sample with the probe using KPFM.

According to another aspect of the preferred embodiments, the probe has an insulating cantilever with a conductive tip made of a single material on one side, and a conductive coating on the other side made of a pure metal.

In yet another embodiment, a method of operating an atomic force microscope (AFM) to measure a sample, the method includes providing an AFM including a probe having a tip, wherein the entire tip is made of a homogeneous material. The AFM is opened in peak force tapping (PFT) mode, and the method includes collecting KPFM data during said operating step.

According to another aspect of this embodiment, the method includes performing a thermal tuning step to determine the fundamental resonant frequency of the probe.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
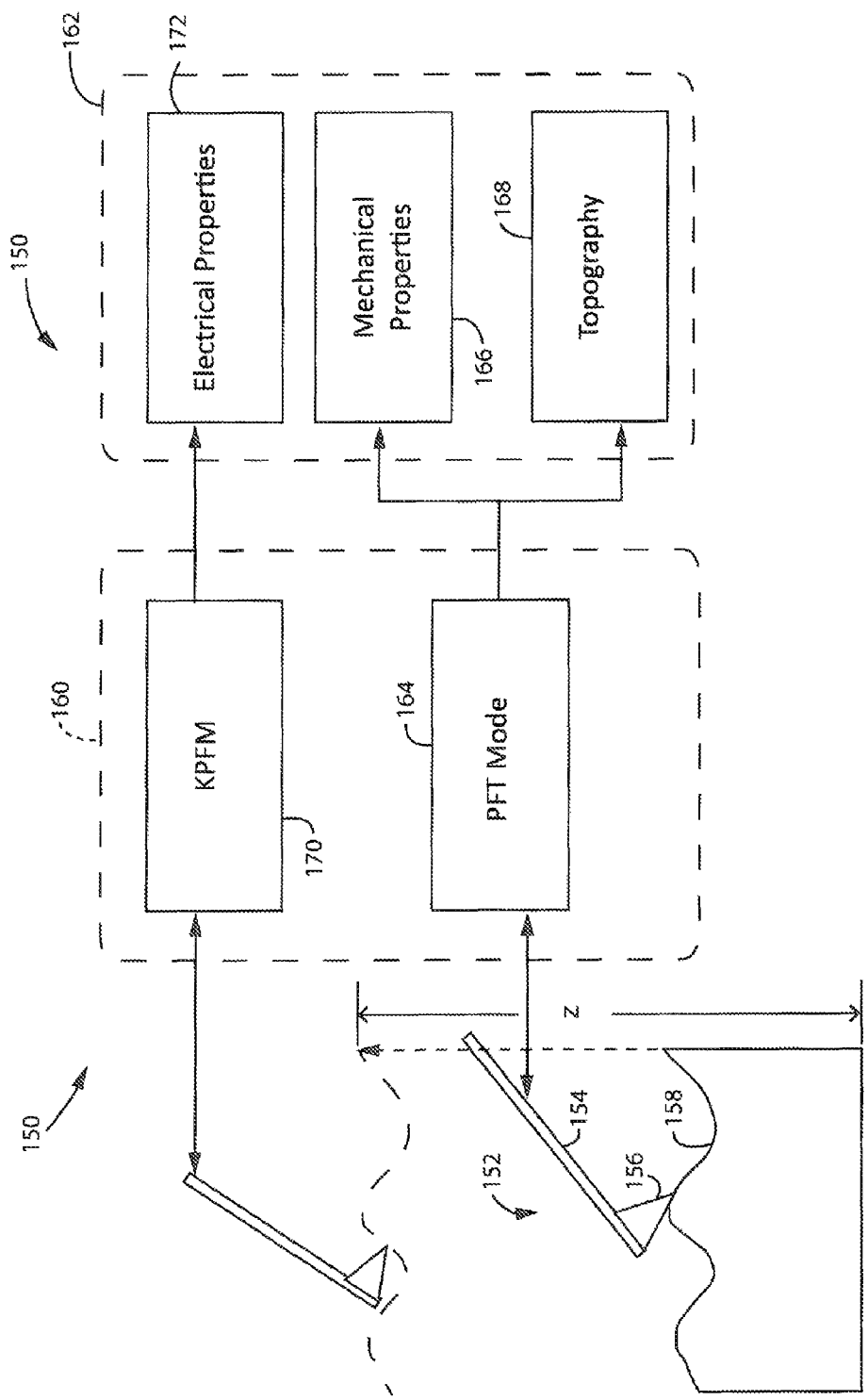
FIG. 1 is a schematic illustration of a preferred embodiment of the invention showing an AFM configured for KPFM operation using PFT mode to collect topography, mechanical property and electrical property data.

The benefits of PFT mode AFM are numerous. Most noteworthy is its capability of simultaneous quantitative mechanical property mapping and topographical imaging. Moreover, its ability to use cantilevers having properties (spring constant, resonant frequency and quality factor) over a wide range allows for probe selection most suited to KPFM operation. It is the object of this invention to combine PFT mode AFM with KPFM, preferably FM-KPFM, and AM-KPFM as an alternative. This will offer simultaneous surface topography, mechanical properties, and surface potential (electrical property) mapping with enhanced sensitivity. Ease-of-use operation also benefits beginner users for getting high quality data without intensive learning and practicing. The implementation and benefits will be outlined below.

Peak Force Tapping Mode (PFT mode), provides a solution to the quantitative mechanical property mapping. With the tip driven in and out of the contact with the surface at multi-kilohertz frequency, the tip's position and mechanical response (bending and thus reflection) are recorded. The recorded data resembles conventional force curve data and are thus analyzed based on a well-defined model. Mechanical properties, such as elasticity, plasticity, adhesion, etc., can be derived for the localized area under the probe's apex. It is notable that the process to capture data and do the analysis is done at very high speed (sub-milliseconds) and therefore quantitative mapping with high special resolution is achieved.

AFM Peak Force Tapping (PFT) mode is described in U.S. Ser. No. 12/618,641 filed Nov. 13, 2009, entitled Method and Apparatus of Operating a Scanning Probe Microscope and U.S. Ser. No. 13/306,867, filed Nov. 29, 2011, and entitled Method and Apparatus of Using Peak Force Tapping Mode to Measure Physical Properties of a Sample. Using PFT Mode, the AFM drives the cantilever at a frequency far lower than the resonant frequency, contrary to TappingMode, allowing essentially instantaneous force monitoring and control. Sample imaging and mechanical property mapping are achieved with improved resolution and high sample throughput, with operation suitable in air, fluid and vacuum environments. Moreover, PFT mode facilitates ease-of-use operation, where an algorithm may be employed to automatically adjust the AFM imaging feedback gain, force setpoint and scan rate based on a predetermined noise threshold.

Though PFT mode provides substantial advantages regarding mechanical property characterization on the nanometer scale, it is unable to provide all data some users need. For instance, characterization of electrical properties of the sample may be desired, including associating one or more electrical properties with one or more corresponding mechanical property characteristics (along with topography) at each data collection point.

As discussed previously, Kelvin Probe Force Microscopy (KPFM) is an established method using AFM to measure some electrical properties such as work function, electrical potential, local charge, dielectric constant, and so on. It uses the same principle as the traditional Kelvin probe. The probe of the AFM serves as the reference electrode which forms a capacitor with the surface under test. Traditional feedback or LiftMode™ is used to keep the distance between the probe and the sample surface constant. An alternating current (AC) voltage is applied to the probe. When the potential between the probe and the sample surface are different, the applied AC voltage will cause the cantilever to vibrate. By detecting this vibration and providing an additional DC offset to minimize it, the potential of the sample surface can be accurately measured. However, traditional KPFM does not give information about a material's mechanical properties.

KPFM techniques using periodic excitations can benefit from operating the AFM so that the response of interest occurs at or near a cantilever resonance. At resonance, the cantilever's amplitude response is $$x = Q\frac{F}{k},$$

i.e., enhanced by a factor Q over the steady-state result derived from Hook's Law, $$x = \frac{F}{k}.$$

Here, F and x are the amplitudes of the sinusoidal force on the cantilever and the resulting displacement, respectively. The cantilever's spring constant is k and Q is the quality factor of its assumed resonance. The best-case signal-to-noise ratio (S/N) at resonance of the detection of the displacement, x, can be estimated from the thermal noise using the equipartition theorem: $k_B T/2 = k(\Delta x)^2/2$, where $k_B$ is the Boltzmann constant, T is absolute temperature, and $\Delta x$ is the expected noise amplitude. Therefore, $$\frac{x}{\Delta x} = \frac{Q}{\sqrt{k}} \frac{F}{\sqrt{k_B T}}.$$

These relations reveal that higher Q and lower k will benefit AM-KPFM sensitivity and detection limit (assuming at S/N=1).

The following analysis helps understand how the characteristics of the cantilever affect FM-KPFM sensitivity. For an AFM cantilever with a spring constant k and an effective mass m, its mechanical resonance frequency is:

$$f = \frac{1}{2\pi}\sqrt{\frac{k}{m}}$$

An external long range force such as electrostatic force with gradient $$\frac{\partial F_{el}}{\partial z}$$

gives rise to a frequency shift:

$$\Delta f = \frac{f}{2k}\Delta k = \frac{f}{2k}\frac{\partial F_{el}}{\partial z}$$

The frequency shift corresponds to a phase shift, which is commonly used in FM-KPFM detection. In a harmonic oscillator, a resonance frequency change across its bandwidth ω/Q corresponds to a phase shift of 90°, therefore, $$\Delta\phi = 90\frac{\Delta\omega}{\omega/Q}$$
$$= 90Q\frac{\Delta\omega}{\omega}$$
$$= 90Q\frac{\Delta k}{2k}$$
$$= 45\frac{Q}{k}\frac{\partial F_{el}}{\partial z}$$

For a given electric force gradient, a bigger sensitivity factor Q/k of the cantilever leads to a bigger phase change, and thus higher measurement sensitivity for FM-KPFM.

From these expressions it is clear that a high Q and low k is desirable for sensitive AM-KPFM, and particularly FM-KPFM measurements.

FM-KPFM under vacuum (absence of air damping) enjoys high sensitivity thanks to the high Q (usually 2-3 orders of magnitude higher than in air). However, for SPM operation in air, which is one of the major advantages of SPM over other high-resolution microscopes such as SEM, potential Q values are limited. Hence, the lowest possible spring constant is important for sensitive KPFM in air. For practical reasons, standard TappingMode SPM operation requires using probes having relatively high spring constants for reliable operation (e.g., the probe tip may stick to the surface of the sample), and not too high a Q value to attain a bandwidth that allows a reasonably fast scan rate. Therefore, KPFM sensitivity is necessarily limited.

PFT mode AFM lifts the restrictions associated with intermittent-contact mode (TappingMode). As a result, probes having a wide range of characteristics can be used to enhance KPFM detection sensitivity. For instance, typical KPFM probes have a sensitivity factor Q/k of around 40. Now, probes having a corresponding Q/k ratio above 40, as well as above 100 and even 200, can be employed with the present preferred embodiments.

The construction of the probe impacts performance as well. In conventional KPFM, the probe tip is not homogeneous; rather, it may be, for example, a silicon tip with a metal coating to make the tip conductive. It has been discovered that performing KPFM using a probe having an inhomogeneous tip can severely limit the accuracy of the acquired KPFM data. In the present preferred embodiments, the probe is made to be homogeneous. "Homogeneous" in the context of the present application means that the probe is made of a single material with the same crystalline structure throughout its volume. In this case, the tip which includes a body defining a base (the base being coupled to the cantilever, either directly, or indirectly with an intermediate insulating layer (described further immediately below)), and an apex (the distal end of the probe tip which interacts with the sample during PF-KPFM operation).

Figure 7:
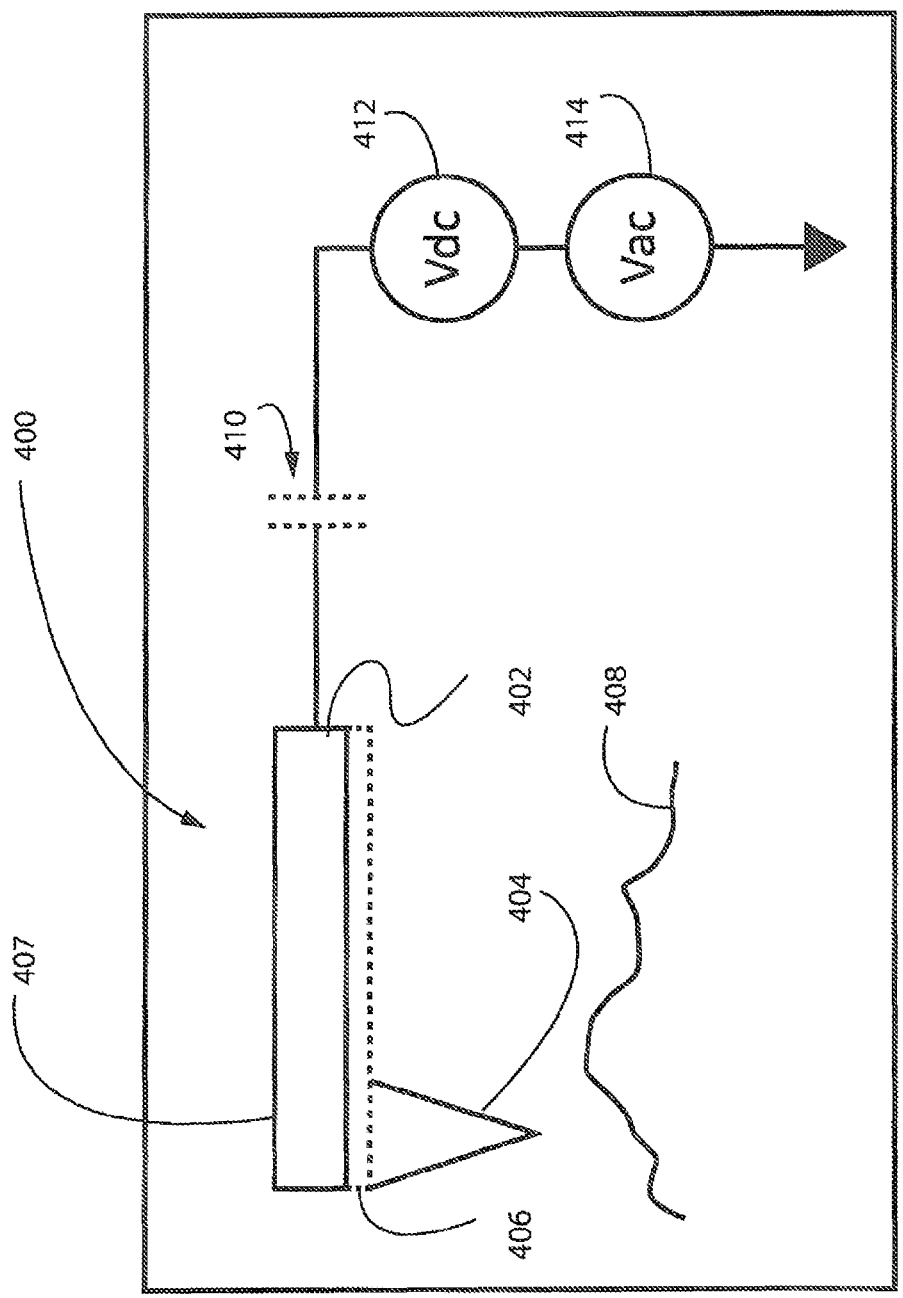
FIG. 7 is a schematic diagram of a preferred embodiment of a probe according to a preferred embodiment.

An illustration of a probe design that overcomes some of the drawbacks of conventional AFM probes used in KPFM is shown in FIG. 7. Unlike prior probes with metal coatings (platinum or gold—possible work function difference between the coating and the probe silicon, especially if coating is scratched), a probe 400 such as that shown in FIG. 7 as part of a KPFM configuration with corresponding $V_{dc}$ and $V_{ac}$ bias sources 412, 414, respectively, is a capacitive probe that provides several advantages. Probe 400 includes a cantilever 402 made of, for example, a silicon nitride insulating lever 406 with a tip made of a single homogeneous material (doped silicon, or pure metal) 404 extending therefrom. A pure metal (e.g., aluminum) can be deposited on the backside or top surface of lever 402 to form a capacitor with tip 404.

With insulating layer 406, probe 400 operates to minimize current flow between the tip and sample. As a result, the chance that an electrochemical reaction occurs at the sample surface is minimized, and thus stability is improved. Moreover, when using probe 400, shifts in measured potential due to tip wear are lessened given that the work function of the probe is dictated by the back side coating material. When employing probe 400, KPFM with 20 mV accuracy/repeatability, or better, can be achieved. This probe will also limit charge dissipation of the sample.

Notably, probe 400 does not require insulating layer 406 (and thus is shown as optional in FIG. 7). In an alternative without layer 406, the entire probe 400 is made of a single homogeneous material. For example, the entire probe could be made of a metal or it could be made of an appropriately doped silicon, with no insulating layer, with a metal (such as aluminum) deposited on its backside for optical detection of probe deflection. In this case, the tip remains homogeneous and thus the work function of the probe material remains constant and accurate KPFM data (e.g., to 50 mV) can be obtained.

In yet another alternative, a capacitor 410 may be added in series to a regular conductive probe to achieve similar effect, though care must be taken with capacitor selection or compromised data (e.g., streaks) may result due to static charge hang-over in capacitor 410.

Referring to FIG. 1, a combination of peak force tapping technology and Kelvin probe measurement is shown as a KPFM instrument 150 including a control block 160 and a data collection unit 162. In one embodiment, the integration of these two state-of-the-art techniques is realized through LiftMode™ operation, i.e., a two pass procedure. Note that herein the terms "single pass" procedure and "two (or dual) pass" procedure are used. These terms refer to the relative scanning motion between the probe and the sample (in XY) during AFM operation being performed either once or twice on the same scan line in a raster scan (e.g., LiftMode™).

In FIG. 1, during a first pass, PFT operating mode is employed to detect/determine the sample surface which often includes acquiring accurate surface topographical information, as well as mechanical properties (via force curves at each X-Y location). More particularly, KPFM 150 includes a probe 152 defining a cantilever 154 supporting a tip 156 at its distal end. Probe 152 is scanned across the surface of a sample 158 while the probe is oscillated generally at a multi-kilohertz off-resonance frequency. The deflection of the lever 154 is monitored and sent to a PFT mode control block 164 which operates to keep the tip sample force at the PFT setpoint. As understood, it is the control provided by PFT mode that may yield signals indicative of mechanical properties of the sample surface, as well as topography. This data is stored in data collection unit 162 depicted in FIG. 1 as blocks 166 and 168, respectively.

Then, once the surface topography is known at each data collection point (X, Y) along one scan line on the sample surface, the tip preferably is lifted up some constant distance "Z" from the surface to follow the surface profile on a second pass/scan of sample surface 158 during which a Kelvin probe measurement is made using a KPFM algorithm 170. Note that if the sample surface is merely determined in the first pass, a simple lift at a user-selected distance may be employed in the second pass of the scan, i.e., topography data, though preferred, need not be collected and used in the second pass; rather, the lift and second pass may be performed regardless of whether the topography is known from the first pass. The electrical property, mechanical property and topography information can then be combined to render a composite view of different surface features of sample 158. Implementations of the KPFM, including a PF-FM-KPFM (FIG. 2) and a PF-AM-KPFM (FIG. 3) are described below.

Figure 2:
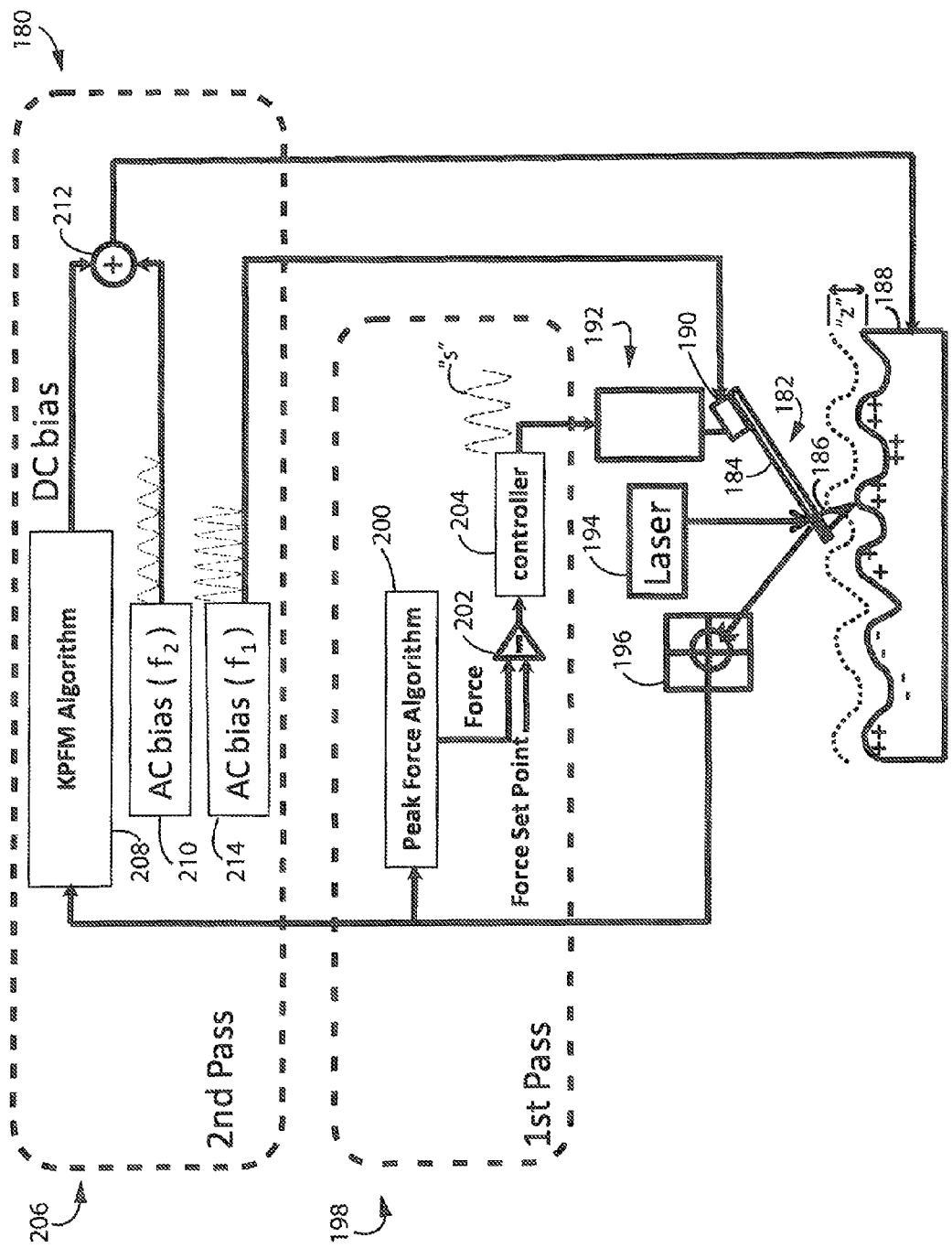
FIG. 2 is a schematic illustration of an exemplary embodiment of the AFM of FIG. 1, configured as a PF-FM-KPFM.

Referring initially to FIG. 2, a PF-FM-KPFM 180 includes PFT mode AFM hardware including a probe 182 defining a cantilever 184 supporting a tip 186. In this two-pass embodiment of the present invention, an AC bias is applied to an actuator 192 coupled to probe 182 to oscillate probe 182 at a multi-kilohertz frequency during a first pass (governed by control block 198; control block 206 is the KPFM control block). Tip 186 of PF-FM-KPFM 180 is thereby caused to interact with the surface of a sample 188. As probe tip 186 interacts with the surface of sample 188, the deflection of probe 182 is monitored by directing a laser beam from a source 194 toward the backside of lever 184, which is then reflected to a detector 196, such as a quadrant photo detector 196. Detector 196 transmits this deflection signal to a peak force algorithm block 200. Peak force algorithm block 200 generates a signal indicative of the force corresponding to the detected deflection, and that force signal is compared to a force setpoint at block 202. A PFT mode controller 204 then determines an appropriate control signal "S" based on the detected force which is transmitted to an actuator 192 (e.g., a piezoelectric XYZ tube) to appropriately position probe 182 in "Z." At each X-Y location of the sample, the interaction is captured to generate a force curve from which several mechanical properties of the sample can be derived. Note that KPFM block 206 is not operational during the first pass in which the DC bias (between the probe and the sample is maintained (e.g., set) at zero.

PFT mode can be performed automatically, in which at least one of the feedback gain, scan rate, and peak force setpoint can be set by the system software. Moreover, though preferred, mechanical property mapping need not be included. When it is, PF-KPFM provides simultaneous (with topography imaging) property mapping of at least one of adhesion, elasticity, hardness, plasticity, surface deformation and energy dissipation, for example.

During a second pass over the sample scan line, probe 182 is "lifted" a fixed distance "z" (usually a few nanometers, up to a few hundred nanometers) from the surface. An AC signal at frequency $f_1$ is applied to the tapping piezoelectric actuator 190 which oscillates the probe at or near its mechanical resonance frequency $f_1$. A second AC bias signal at frequency $f_2$ is applied to the sample which produces an AC electric field between the probe and the sample. The overall effect is a probe response with side bands at $f_1 \pm nf_2$ frequencies. The KPFM feedback scheme continues to adjust the DC bias so that the side bands at $f_1 \pm f_2$ vanishes manifesting that the electric force gradient is nullified. The potential at the surface of sample 188 at that XY location is therefore quantified/measured, i.e., the applied DC voltage equals the CPD.

Alternatively, a dual frequency AC bias can be used: with the first frequency at half the resonance frequency of the cantilever, which replaces the mechanical drive to cause the probe to vibrate at its resonant frequency; and the second frequency again at a few kilohertz.

Figure 3:
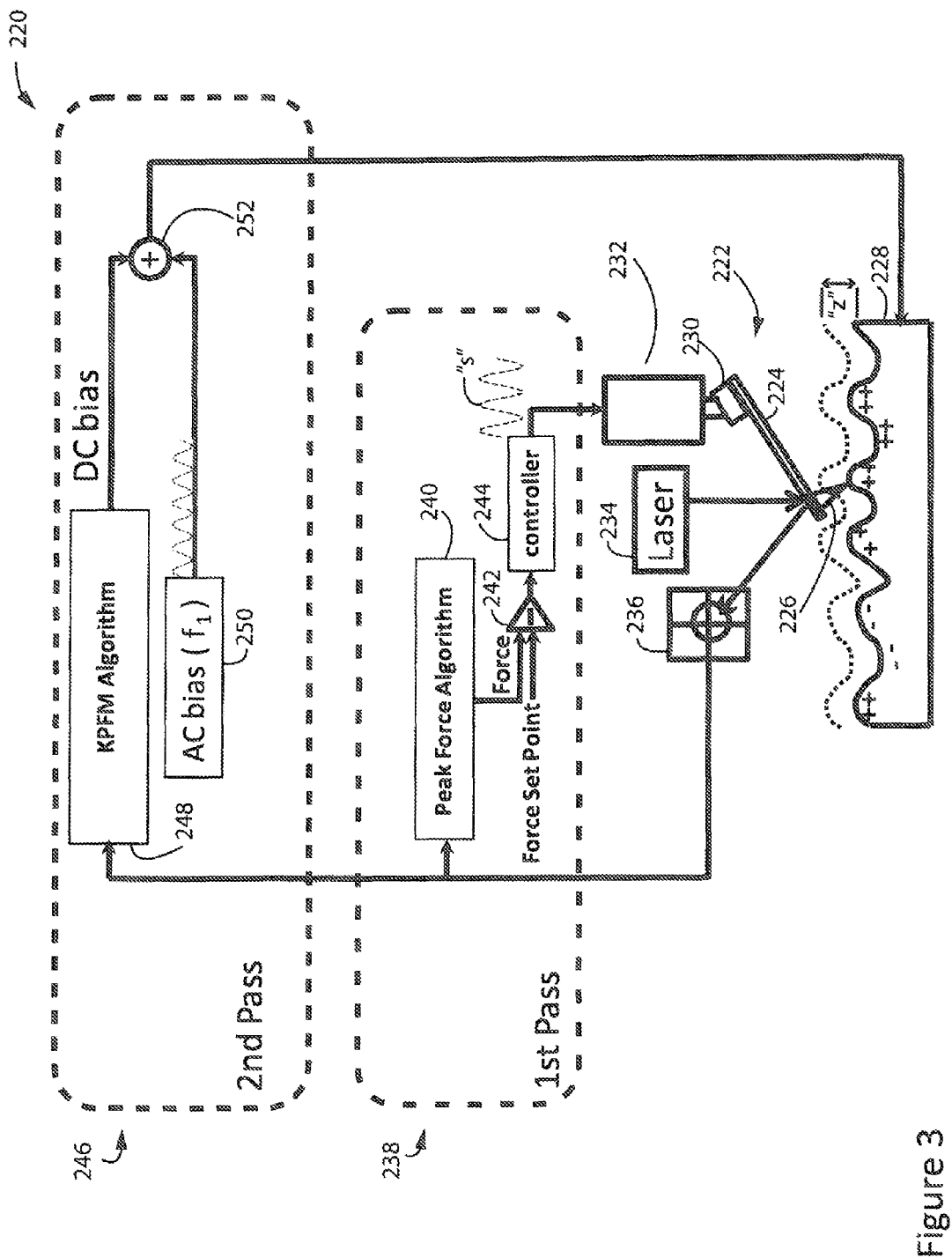
FIG. 3 is a schematic illustration of an exemplary embodiment of the AFM of FIG. 1, configured as a PF-AM-KPFM.

In another embodiment of the invention, a PF-AM-KPFM 220 is employed as shown in FIG. 3. PF-AM-KPFM 220 includes PFT mode AFM hardware including a probe 222 defining a cantilever 224 supporting a tip 226. As tip 226 interacts with a surface of a sample 228, the deflection is monitored, for example, by providing a laser source 234 which directs light toward the backside of cantilever 224 for reflection to a detector 236.

In this case, during the first pass, the Z-position of probe 222 is controlled by PFT feedback to follow the sample surface. Probe 222 is made to oscillate in the "Z" direction to periodically touch the surface of sample 228. PFT feedback is implemented using PFT algorithm at block 240 which generates a force signal in response to the deflection signal, the force signal being compared to a force setpoint at block 242. Based on the output of comparison circuit 242, a controller 244 determines an appropriate PFT control signal "S" to be applied to an actuator 232 (XYZ piezoelectric tube, for example) to adjust the Z-position of probe 222 coupled thereto to maintain the tip-sample force at the setpoint. At each X-Y location, the interaction may be captured to generate a force curve from which mechanical properties can be derived. Note that KPFM block 246 is not operational during the first pass in which the DC bias (between the probe and the sample is maintained (e.g., set) at zero. During a second pass, the cantilever is lifted a fixed distance "z" from the sample 228. An AC bias signal at frequency $f_1$ from source 250 is applied between the probe and the sample at frequency f#. A KPFM feedback algorithm 248 (implemented in digital or analog circuitry) determines a DC bias based on the detected deflection of probe 222, the DC bias being combined with the AC bias at block 252 to continuously adjust the DC bias so that the probe's oscillation at $f_1$ is minimized. When $f_1$ is minimized, there is no DC electrical field between the probe and the sample. In this case, the potential at the sample surface at that XY location is therefore quantified/measured, i.e., the applied DC voltage equals the CPD.

Alternatively, KPFM including both PF-FM-KPFM and PF-AM-KPFM can operate with feedback off thereby essentially reducing KPFM to an electric force microscope (EFM), where phase or amplitude will be measured instead of potential.

Figure 4:
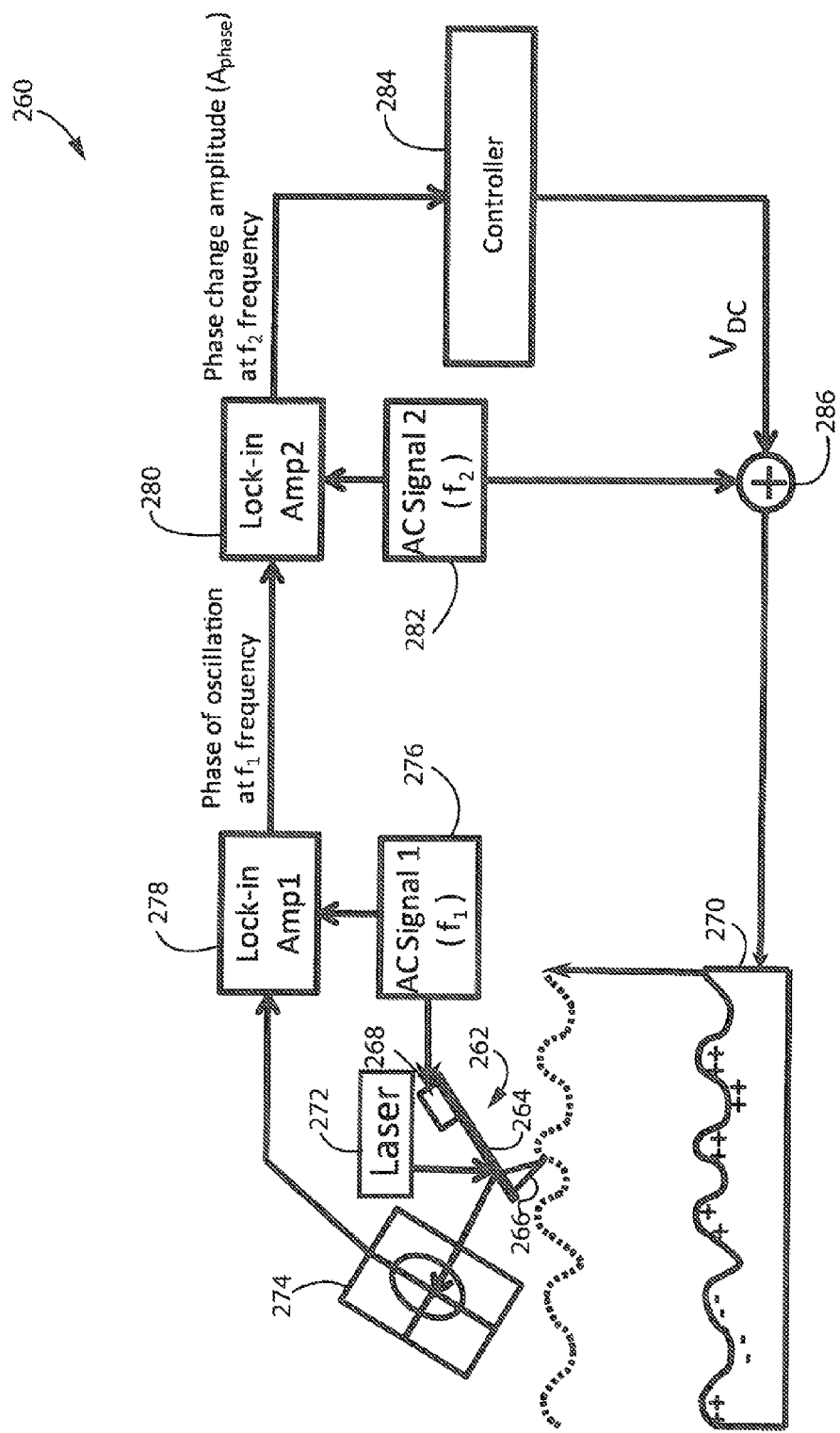
FIG. 4 is a schematic illustration of an apparatus for providing FM modulation in the exemplary embodiment shown in FIG. 2.

Turning next to FIG. 4, the FM modulation/demodulation in the PF-FM-KPFM embodiment shown in FIG. 2 is shown. Two lock-in amplifiers 278, 280 in cascade are used to implement the FM demodulation (block 208, FIG. 2), and related feedback. AC signal 1 ($f_1$) is generated by source 276 and applied to a piezoelectric actuator 268 (tapping piezo) supporting a probe 262 defining a lever 264 having a tip 266 at its distal end. Deflection of the probe is monitored by an optical detection scheme including a laser 272 which directs a light beam at the backside of lever 264 so it is reflected toward a detector 274. An actuator 268 (e.g., a tapping piezoelectric actuator) oscillates probe 262 at the probe's resonant frequency. At substantially the same time, a second AC signal at frequency $f_2$ generated by a source 282 is applied to a sample 270. This causes the frequency at which probe 262 oscillates to vary, which is reflected in the phase change of the $f_1$ component and can be detected by Lock-in Amplifier (LIA) one 278. The output of LIA 278 can be phase, amplitude, in-phase and quadrature, but preferably phase.

The output of LIA 278 is then fed to Lock-in amplifier two 280 to determine its amplitude ($A_{phase}$) at the $f_2$ frequency, which is essentially the amplitude at sidebands $f_1 \pm f_2$. This is used by the feedback algorithm of controller 284 to determine an appropriate DC bias to be applied to sample 270 (combined with AC Signal 2 at block 286) to nullify $A_{phase}$. As a result, the potential of sample 270 is quantified/measured with reference to probe 262. Note that while two LIAs in cascade are shown and described, alternatives are contemplated. For instance, a combination of a filter and a lock-in amplifier could be used, as well as a combination of a frequency-voltage converter and a lock-in amplifier.

Figure 5:
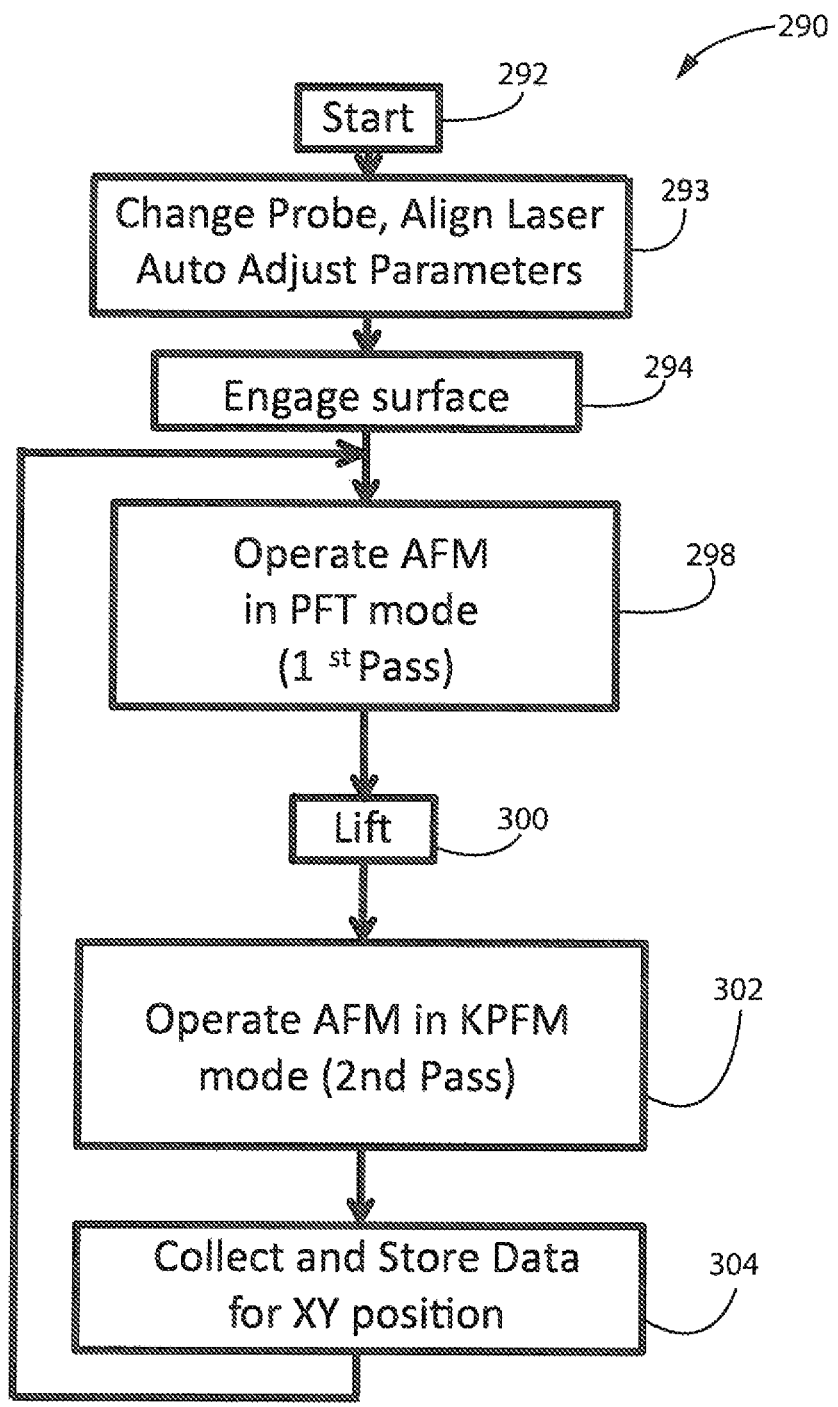
FIG. 5 is a flow chart illustrating a two-pass KPFM method according to an exemplary embodiment.

A method 290 of operating the KPFM according to a preferred embodiment is shown in FIG. 5. In this two pass approach/procedure, after an initialization and start up step at Block 292, the laser for the optical detection set-up is aligned with the probe and the method auto adjusts the PF-KPFM (FM or AM) operating parameters in Block 293. A fast thermal tune algorithm is also employed to determine the thermal peak frequency (fundamental resonant frequency of the probe) which is used as the AC bias drive frequency ($f_1$) by either a) drive 214 of PF-FM-KPFM of FIG. 2, or b) drive 250 of PF-AM-KPFM of FIG. 3. The fast thermal tune algorithm is described in U.S. Prov. Pat. Appt. 61/558,970, filed on Nov. 11, 2011, which is hereby expressly incorporated by reference, and is operated to collect relatively small chunks of data (e.g., 500 ms as opposed to the several seconds, or tens of seconds of data typically collected.) The KPFM AC bias drive amplitude (drive 214 of FIG. 2) is also auto adjusted, while the AC bias phase offset is auto adjusted (drive 214 of FIG. 2, 250 of FIG. 3) as well, both in Block 293. Lastly, if a probe needs to be swapped out, this also is performed as part of Block 293 of method 290.

Notably, by providing robust data collection components, the preferred embodiments are capable of collecting absolute value KPFM electrical data with 20 mV accuracy. Advantageously, as a result of this accuracy/repeatability improvement over known systems, the KPFM apparatus and methods of the preferred embodiments are completely instrument and probe independent, facilitating significant improvements in operator ease of use.

Method 290 then operates to engage surface at Block 294, for example, using a rapid engage algorithm such as that shown and described in U.S. Pat. No. 7,665,349. Relative scanning motion between the probe and sample is initiated and AFM is operated in PFT mode as part of a first pass in Block 298. As part of this $1^{st}$ pass in Block 298, the bias voltage is set to zero. Once the sample surface data is acquired, the topography is known and the probe is lifted off the surface a selected distance in Block 300. As stated previously, the distance the probe is lifted off the surface can be user-selected independent of the sample topography; for example, in the case in which topography data is not acquired and the surface is simply sensed in the first pass. Then, the KPFM is operated as part of a second pass of relative motion between the sample and probe in Block 302. As part of this $2^{nd}$ pass, the bias voltage is applied. KPFM data can then be collected and stored according to the above described techniques in Block 304.

Figure 6:
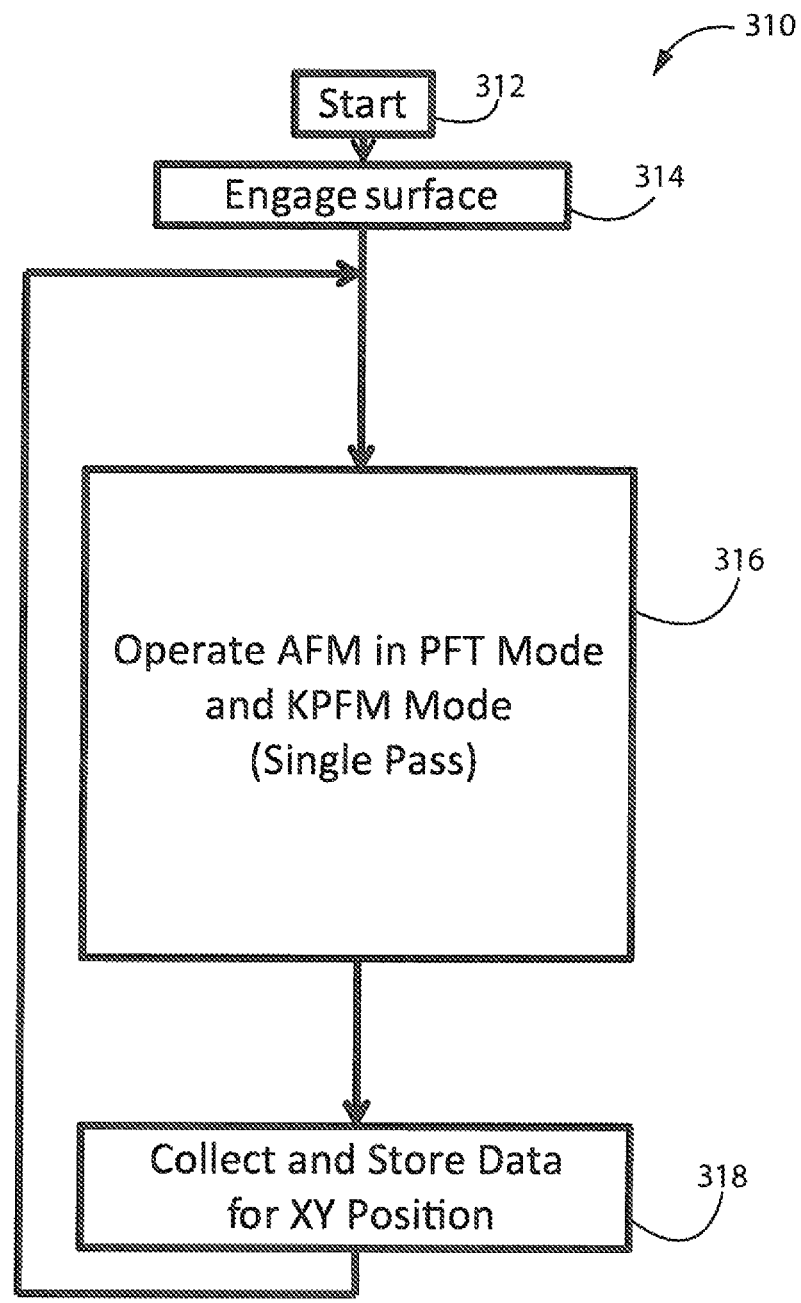
FIG. 6 is a flow chart illustrating a single-pass KPFM method according to an exemplary embodiment.

FIG. 6 illustrates a preferred embodiment in which a single pass is employed to collect topography, mechanical and electrical property data concerning the sample surface. More particularly, a method 310 includes a start up and initialization step at block 312. Thereafter, the probe and sample are engaged with one another in block 314. Next, in block 316, both the KPFM algorithm and the PFT algorithm are operated substantially simultaneously to acquire topography, mechanical property and electrical property data in a single pass. The data acquired in block 316 is then collected and stored for each XY position in block 318. Generally, the method 290 illustrated in FIG. 5 may in some cases be preferred to minimize adverse effects due to crosstalk.

High-Voltage KPFM

Known KPFM technology is capable of making voltage measurements up to a ±12V.

Figure 8:
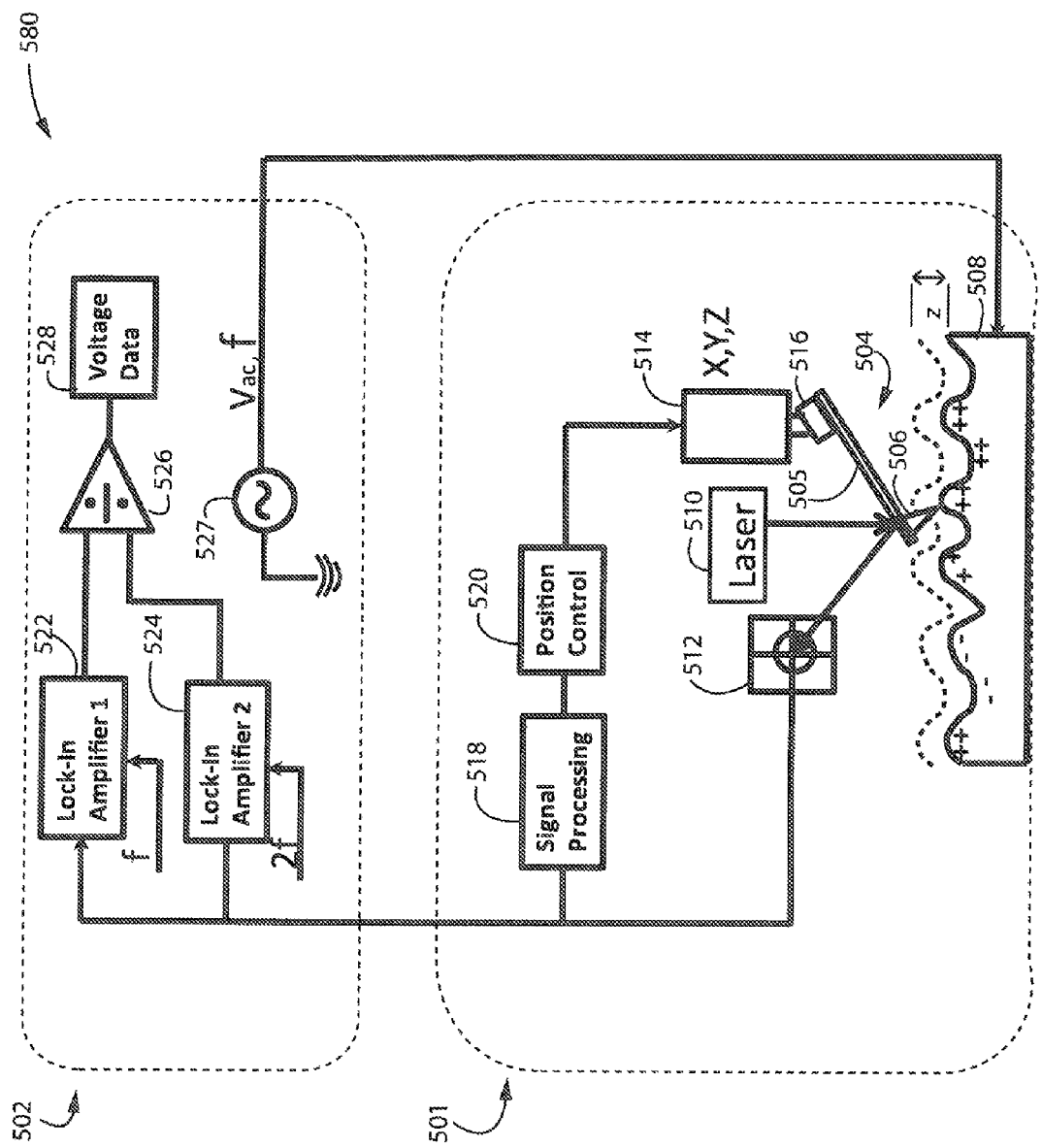
FIG. 8 is a schematic illustration of an alternative embodiment for performing high voltage KPFM measurements.

With the present embodiment, making voltage measurements up to tens of volts (e.g., surface charge on a polymer), and even hundreds of volts, is possible. A high voltage KPFM instrument (KPFM-HV) 500 is shown in FIG. 8 and described below. KPFM-HV 500 is preferably configured to operate as a two-pass method employing PFT mode AFM; however, as an alternative, AM-AFM or FM-AFM may be used. The first pass uses feedback control as part of an AFM configuration 501 to determine physical properties of the sample, including topography, while the second pass employs a high voltage detection circuit 502 to collect KPFM data.

More particularly, in the first pass of probe-sample interaction, if PFT mode is employed, at least one of surface topography and well defined mechanical property information (adhesion, etc.) is obtained. If either AM-AFM mode or FM-AFM mode is employed, surface topography with unidentifiable mechanical properties are obtained. A probe 504 including a cantilever 505 supporting a tip 506 is caused to interact with a sample 508 by driving it in to oscillation using a tapping piezo 516 or other piezoelectric actuator. Deflection of probe 504 is detected by detector 512 and transmitted to a signal processing block 518 that outputs a force control signal (PFT mode) that together with the scan control signal from position control block 520 appropriately positions the probe relative to the sample via appropriate signals sent to XYZ actuator 514. In the second pass, an AC bias at a frequency lower than half of the cantilever resonant frequency is applied between the probe and the sample via source 527. This AC bias causes the relative motion between the probe and sample to oscillate at a frequency f, as well as at its 2nd harmonic. The amplitude at these frequencies is determined using a pair of lock-in amplifiers, Lock-In Amplifier one 522 (AC bias frequency (FM) 1-20 kHz, phase: +900) and Lock-In Amplifier two 524, respectively. The electric potential between the tip and sample can be calculated at Block 526 based on the oscillation amplitude at frequencies f and 2f. In particular, potential $$\text{Potential} = \text{sign}(Phase1) * \frac{1}{4} V_{ac} \frac{Af}{A_{2f}}\bigg|_{V_{dc}=0}$$

and the voltage/potential data is stored at block 528. Notably, whether PFT feedback is used or not, KPFM feedback is not employed in this high voltage detection regime.

Figure 9:
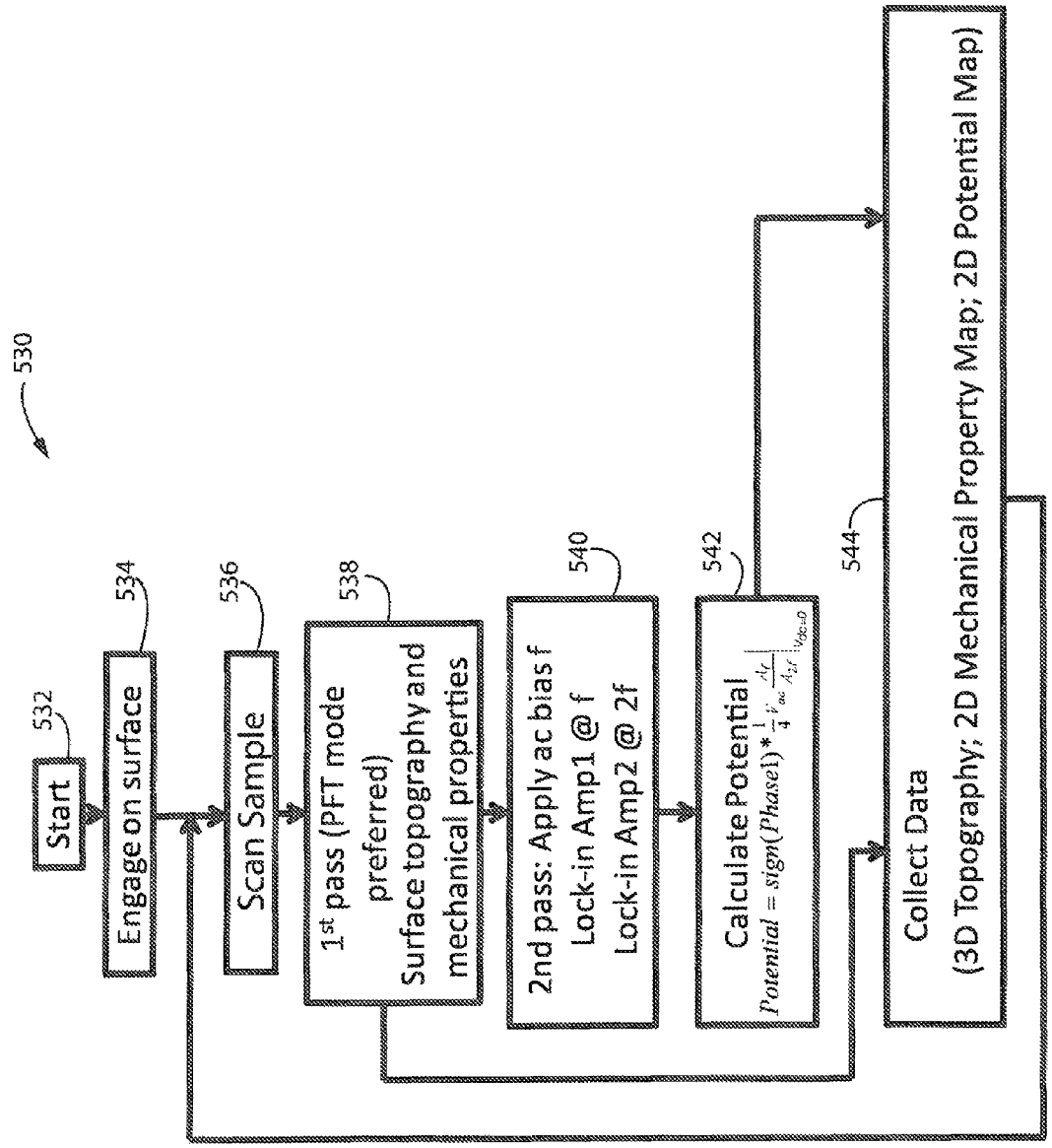
FIG. 9 is a flow chart illustrating a two-pass KPFM method associated with the alternative embodiment shown in FIG. 8.

FIG. 9 is directed to a method 530 associated with the high voltage KPFM-HV shown in FIG. 8, using a two-pass approach (LiftMode™). After a start-up and initialization step 532, method 530 engages the probe on the sample surface in Block 534. Relative scanning motion between the probe and the sample is provided in Block 536 (raster scan, e.g.) while PFT mode feedback is provided in Block 538. During this first pass, surface topography and mechanical property data is collected. In Block 540, the probe is lifted a certain amount "z" and a second pass is initiated. During this second pass, the amplitude response of the probe is determined at frequencies f and 2f using lock-in amplifiers (FIG. 8). Method 530 then calculates potential in Block 542. The data is then compiled to generate a 3D topography map and a 2D mechanical property map from the PFT mode control signals, and a corresponding 2D potential map from the $2^{nd}$ pass data, in Block 544.

Figure 10:
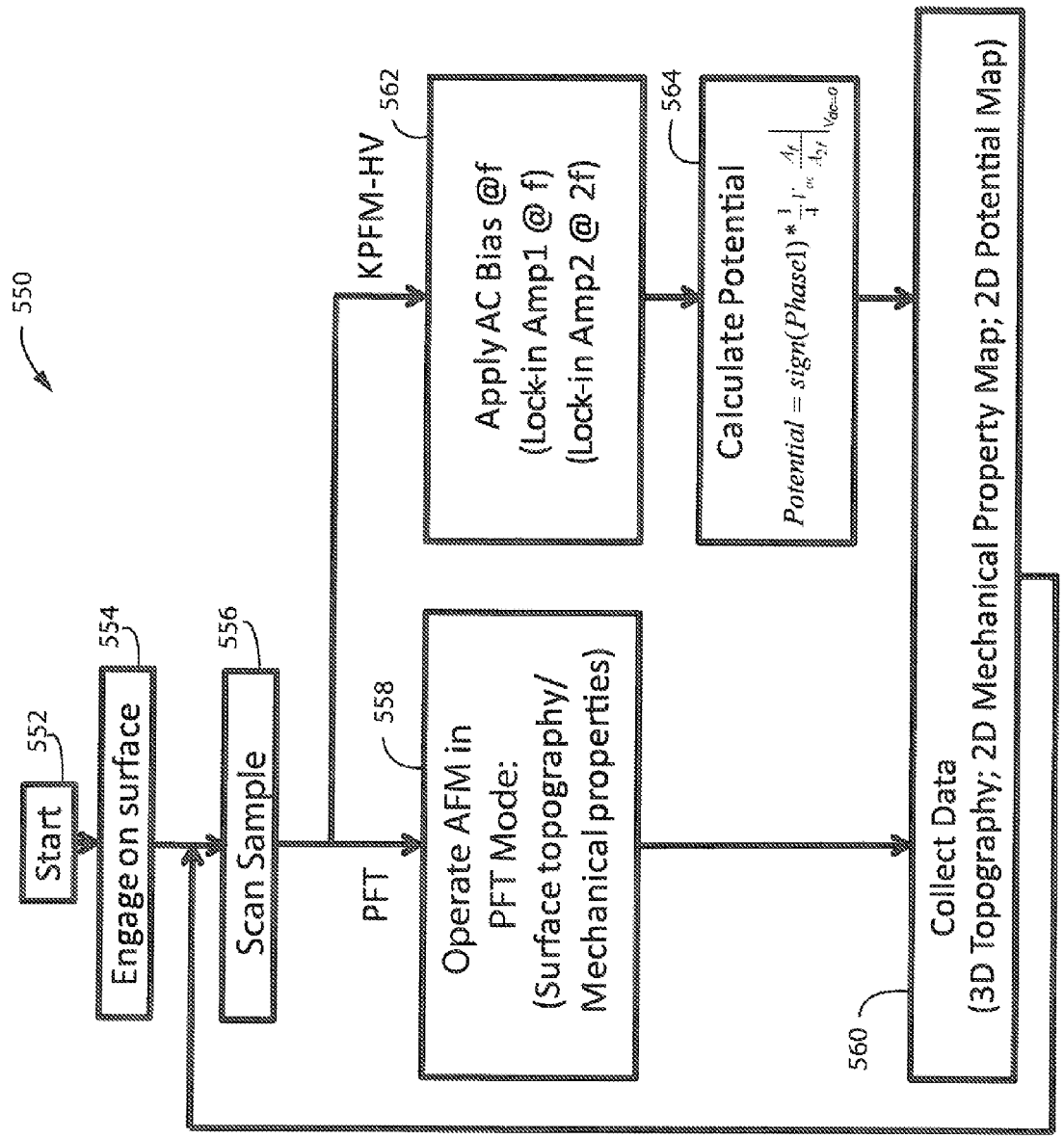
FIG. 10, is a flow chart illustrating a single pass KPFM method associated with the alternative embodiment shown in FIG. 8.
Figure 11:
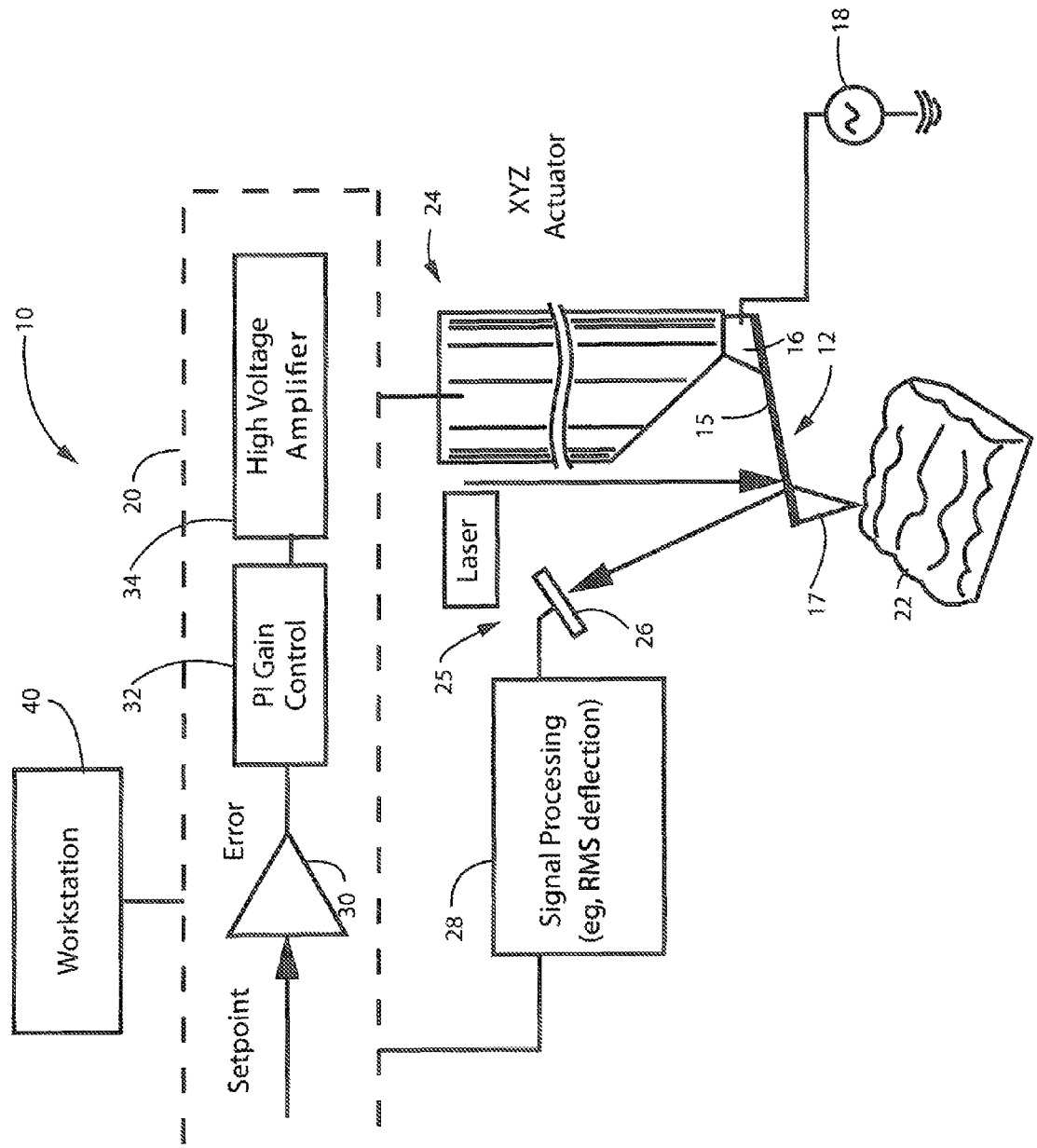
FIG. 11 is a schematic illustration of a prior art atomic force microscope (AFM)
Figure 12:
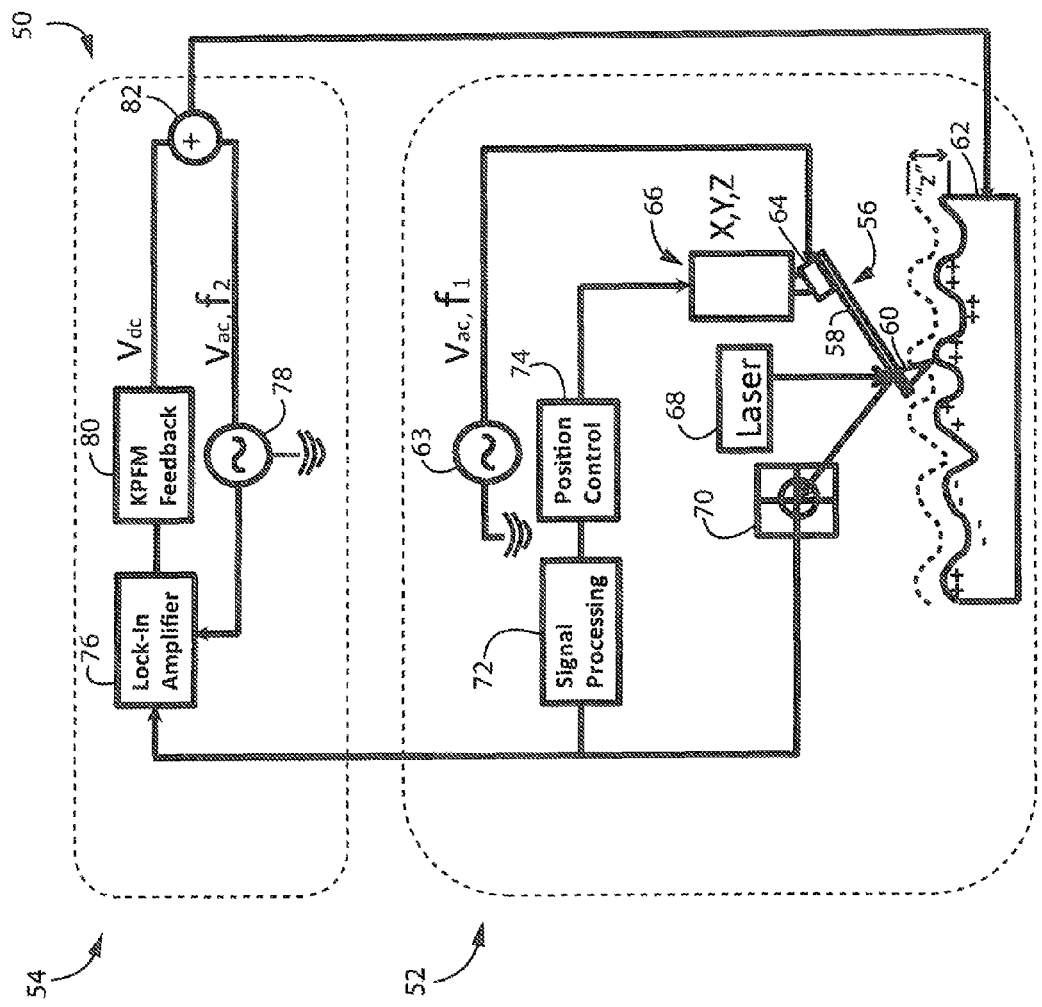
FIG. 12 is a schematic illustration of a prior art KPFM, namely, an AM-KPFM.
Figure 13:
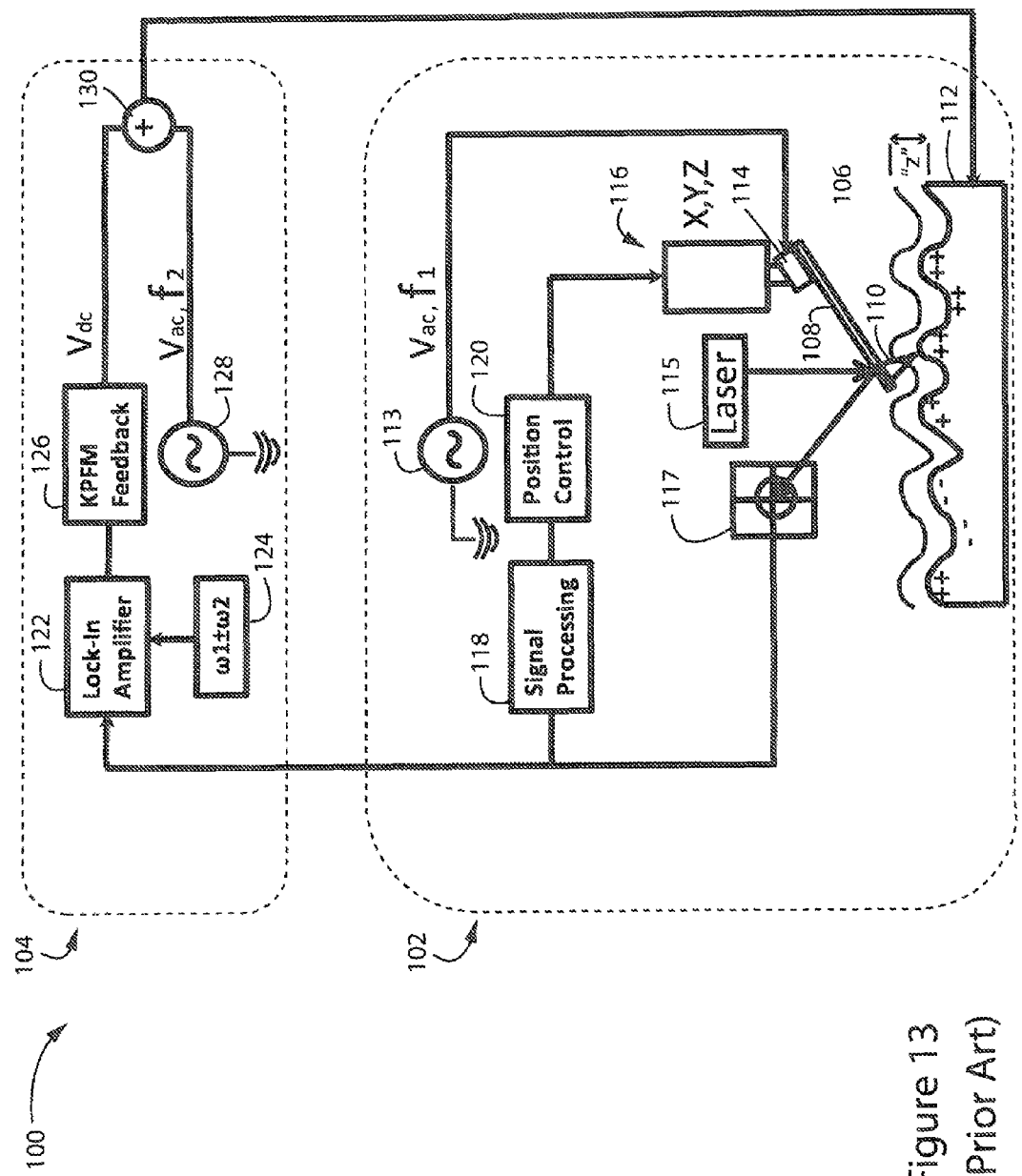
FIG. 13 is a schematic illustration of a prior art KPFM, namely, an FM-KPFM.
Figure 14:
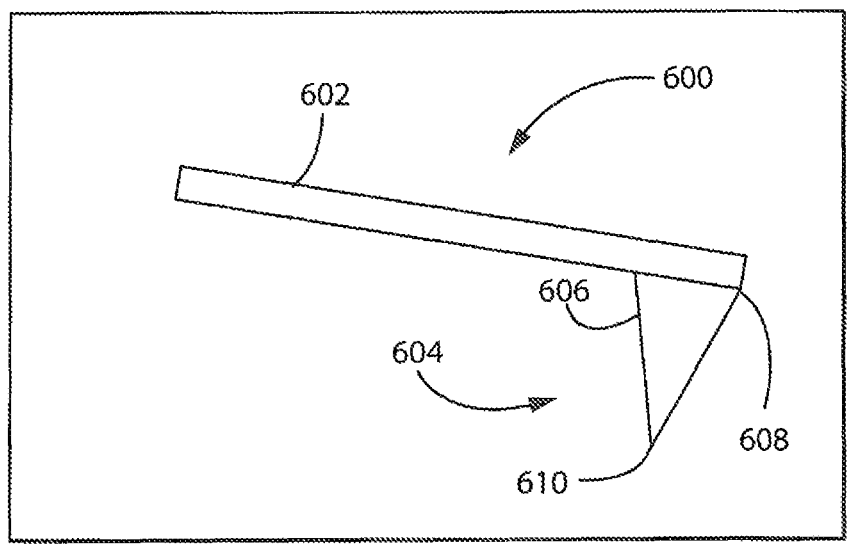
FIG. 14 is a schematic illustration of a prior art AFM probe.

FIG. 10 is directed to a method 550 associated with the KPFM-HV shown in FIG. 8, using a single pass approach. After a start-up and initialization step in Block 552, method 550 provides relative scanning motion between the probe and the sample in Block 554. In this case, both PFT mode feedback and KPFM-HV detection circuitry are operated simultaneously in Blocks 558 and 562, respectively. The potential is calculated in Block 564 and the data is then compiled in Block 560 to generate a 3D topography map and a 2D mechanical property map from the PFT mode control signals, and a corresponding 2D potential map from the KPFM-HV detection branch.

ADVANTAGES

The preferred embodiments offer simultaneous acquisition of surface topography, mechanical properties, and surface potential (electrical property) mapping. PFT mode AFM's ability to use cantilevers having properties (spring constant, resonant frequency and quality factor) over a wide range can be used to the advantage of KPFM measurement. For instance, probes with low spring constant and high quality factors that are restricted for Tapping mode operation, now can be used to enhance KPFM detection sensitivity.

The preferred embodiments also improve the KPFM measurement repeatability by extending the lifetime of the probes. As discussed above, the force exerted to the tip and sample can be much smaller in peak force tapping mode than in tapping mode or contact mode. Tip wear and tear is therefore greatly reduced, which benefits KPFM spatial resolution (tip remains sharp over long scan time) and measurement consistency.

Ease-of-use is another advantage. Traditional KPFM uses TappingMode or contact mode to acquire the surface profile data. Tapping Mode is complicated by (a) indirect force control, (b) cantilever resonance dynamics of multiple harmonics, and (c) amplitude or phase of the probe oscillation during data acquisition can be affected by many factors other than the tip-sample interaction force. Due to these complications, subjective judgment must be employed, most often requiring much knowledge and experience. Even in contact mode AFM, constant drift of the cantilever deflection due to thermal or other system factors makes accurate force control generally impossible. With the present method, PFT mode is used to acquire topographic data. PFT mode eliminates many of the complications discussed above. The criteria used to judge optimal imaging parameters become simple and objective. As a result, the measurement procedure can be automated.

In addition, the resonant frequency of the probe may be readily determined using thermal tuning (automatically). With respect to the lock-in amplifier configuration, the phase can be set automatically. While the mechanical drive amplitude is preferably automatically set to drive probe oscillation at optimal amplitude to enhance operational consistency.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method for measuring multiple properties of a sample, the method including:
   providing an atomic force microscope (AFM) including a probe having a cantilever and a tip;
   operating the AFM to cause the probe to interact with the sample in a two pass procedure;
   detecting, during a first pass of the two pass procedure, a surface of the sample by operating the AFM in peak force tapping (PFT) Mode; and
   collecting, during a second pass of the two pass procedure, electrical property data corresponding to the sample with the probe.

2. The method of claim 1, further comprising acquiring at least one of topography and mechanical property data during the detecting step.

3. The method of claim 2, wherein the acquiring step includes collecting mechanical property data and the mechanical property data includes at least one of elasticity, stiffness, plasticity, viscoelasticity and hardness.

4. The method of claim 3, wherein the first collecting step includes collecting topography data which is used to perform said collecting electrical property data step.

5. The method of claim 1, wherein the probe has a sensitivity factor (Q/k) greater than 40.

6. The method of claim 1, wherein the second pass of the collecting step includes using at least one of FM-KPFM and AM-KPFM.

7. The method of claim 6, wherein a DC bias employed in the second pass is set to zero in the first pass.

8. The method of claim 7, wherein an AC bias is set to equal half the fundamental cantilever resonant frequency in the second pass.

9. The method of claim 1, further comprising generating a map of at least two of topography, mechanical properties and electrical properties of the sample.

10. The method of claim 1, further comprising driving, during the second pass, the probe at or near its resonant frequency, and driving the AC bias between the tip and sample at a substantially lower frequency (about 1-10 kHz).

11. The method of claim 1, wherein the probe includes a cantilever and a tip, and the tip including a body having a base and an apex, and wherein the body of the tip is made of a homogeneous material.

12. The method of claim 11, wherein an insulating layer is disposed between the cantilever and the tip.

13. The method of claim 11, wherein a combination of the cantilever and the tip is made of a single homogeneous material.

14. The method of claim 11, wherein the operating step includes using PFT mode to collect the topography data and the mechanical property data.

15. The method of claim 14, wherein the operating step is performed as a two pass procedure using LiftMode™, and the topography data collected in a first pass of the two pass procedure is used in the second pass.

16. The method of claim 15, wherein the second pass includes using FM-KPFM and wherein the FM modulation step includes providing first and second lock-in amplifiers in a cascade configuration.

17. The method of claim 1, further comprising performing a thermal tuning step to determine the fundamental resonant frequency of the probe.

* * * * *